(12) United States Patent
Dholakia et al.

(10) Patent No.: US 9,274,335 B2
(45) Date of Patent: Mar. 1, 2016

(54) CONTROLLING LIGHT TRANSMISSION THROUGH A MEDIUM

(75) Inventors: Kishan Dholakia, Fife (GB); Tomas Cizmar, Fife (GB)

(73) Assignee: UNIVERSITY COURT OF THE UNIVERSITY OF ST ANDREWS, St Andrews (GB)

(*) Notice: Subject to any disclaimer, the term of this patent is extended or adjusted under 35 U.S.C. 154(b) by 93 days.

(21) Appl. No.: 14/233,105

(22) PCT Filed: Sep. 13, 2012

(86) PCT No.: PCT/GB2012/052270
§ 371 (c)(1),
(2), (4) Date: May 14, 2014

(87) PCT Pub. No.: WO2013/038193
PCT Pub. Date: Mar. 21, 2013

(65) Prior Publication Data
US 2014/0239149 A1    Aug. 28, 2014

(30) Foreign Application Priority Data
Sep. 13, 2011 (GB) .................................. 1115807.8

(51) Int. Cl.
*H04N 5/228* (2006.01)
*H01L 27/00* (2006.01)
*G02B 27/00* (2006.01)
(Continued)

(52) U.S. Cl.
CPC ............... *G02B 27/0025* (2013.01); *G01J 1/02* (2013.01); *G02B 26/06* (2013.01); *G02B 27/0933* (2013.01)

(58) Field of Classification Search
CPC . G02B 27/0025; G02B 26/06; G02B 27/0933
See application file for complete search history.

(56) References Cited

U.S. PATENT DOCUMENTS

| 5,535,029 A | 7/1996 | Clark |
| 2004/0125380 A1 | 7/2004 | Pepper |

(Continued)

FOREIGN PATENT DOCUMENTS

| EP | 2053349 A3 | 4/2009 |
| WO | WO 2008/010996 A2 | 1/2008 |

OTHER PUBLICATIONS

International Search Report for GB1115807.8 dated Jan. 12, 2012.
(Continued)

*Primary Examiner* — Tony Ko
(74) *Attorney, Agent, or Firm* — Moore & Van Allen PLLC; W. Kevin Randsom

(57) ABSTRACT

Methods for controlling light transmission through a medium by transmitting light from a single spatial portion of an input optical field through the medium creating an output optical field, superposing the output optical field with a reference optical field creating an optical interference field, detecting an intensity of a spatial portion of a polarization component of the optical interference field and using the detected intensity to determine a value of an optical field amplitude and of an optical field phase for each of a plurality of spatial portions of the input optical field and for each of first and second orthogonal input polarization states of transmitted light entering the medium. The method may be used in the control of the transmission of light 1) through a medium, which is randomizing in amplitude, phase and/or polarization or 2) through a multimode fiber or for beam shaping, optical trapping and/or optical manipulation.

49 Claims, 11 Drawing Sheets

(51) Int. Cl.
  *G02B 26/06* (2006.01)
  *G02B 27/09* (2006.01)
  *G01J 1/02* (2006.01)

(56) References Cited

U.S. PATENT DOCUMENTS

| 2007/0176077 | A1 | 8/2007 | Barchers |
| 2008/0151244 | A1* | 6/2008 | Okabe ................ G01R 13/347 356/364 |
| 2008/0198380 | A1 | 8/2008 | Straaijer et al. |
| 2010/0296152 | A1 | 11/2010 | Shiraishi |

OTHER PUBLICATIONS

Shemirani, Mahdieh et al.: Compensation of Multimode Fiber Dispersion by Optimization of Launched Aplitude, Phase, and Polarization; Journal of Lightwave Technology, vol. 28, No. 14, Jul. 15, 2010, pp. 2084-2095.

International Search Report for PCT/GB2012/052270, dated Mar. 12, 2013.

* cited by examiner

Figure 4

CONTROLLING LIGHT TRANSMISSION THROUGH A MEDIUM

FIELD OF THE INVENTION

The present invention relates to a method for use in controlling light transmission through a medium and, in particular, though not exclusively, for use in controlling the amplitude, phase and/or polarization of light through a medium such as a multi-mode optical fiber.

BACKGROUND OF THE INVENTION

"Hologram transmission through multi-mode optical fibers", Optical Express 19, 247-254 (2011), R. D. Leonardo and S. Bianchi discloses one approach for concentrating light output from a multi-mode fiber (MMF) into one or several spots using a direct or blind search method. Such a method relies upon a phase only analysis of the optical field input to the MMF. This may, however, lead to loss of optical power and/or the generation of noise when creating one or several spots at the output of the MMF.

Nature Photonics, 4, 388-394 (2010), T. Čižmár, M. Mazilu and K. Dholakia discloses a method of controlling the transmission of light within a highly scattering and diffusive, but essentially polarization preserving medium and, in particular, within biological tissue. The method comprises characterizing an optical system including the biological tissue in terms of both amplitude and phase of an optical field detected using a single intensity probe. Subsequently a complex field transformation is used to control an input optical field according to the determined amplitudes and phases of the optical field so as to provide a desired intensity within the biological tissue. Such a method may lead to loss of optical power and/or the generation of noise when creating one or several spots within the medium. Such a method also relies upon the use of a reference path defined internally within the biological tissue. Using such an internal reference path may cause several problems when controlling the transmission of light within a medium. For example, the use of an internal reference path may lead to inaccuracies during the characterization of the optical system and contribute to a loss of optical power when creating one or more intensity spots. The use of an internal reference path may, in some circumstances, even lead to failure of the method altogether. A reference optical field generated as a consequence of transmission of light along an internal reference path may exhibit a speckled character with an exponential distribution of intensity such that some parts of the reference optical field have very high intensities whilst others may have extremely low intensities, so termed 'blind spots', which cannot be used in the characterization of the optical system. An intensity detector having a very large dynamic range and high resolution may then be required to detect the intensity of the reference optical field and/or of any optical interference field generated between light transmitted along the internal reference path and light transmitted along a measurement path extending through the medium.

SUMMARY OF THE INVENTION

According to a first aspect of the present invention there is provided a method for use in controlling light transmission through a medium comprising the steps of:

(i) transmitting light from a single spatial portion of an input optical field through the medium to create an output optical field;

(ii) superposing the output optical field with a reference optical field to create an optical interference field;

(iii) detecting an intensity of a spatial portion of a polarization component of the optical interference field;

(iv) using the detected intensity to determine a value of an optical field amplitude and a value of an optical field phase; and (v) repeating steps (i) to (iv) for each of a plurality of spatial portions of the input optical field and for each of first and second orthogonal input polarization states of the transmitted light entering the medium.

The method may be used for characterizing an optical system comprising a medium which is randomizing in at least one of amplitude, phase and polarization of light transmitted through the medium.

Once the optical system is characterized, the input optical field may be selected to control light transmission through the medium. The method may be used in controlling the amplitude, phase and/or polarization of a spatial portion of an output optical field by controlling only an input optical field on an input side of the medium. Once the transformation of the optical system is acquired, the output optical field may be controlled at will within any physical limitations imposed by the optical system used to implement the method.

The transformation of the optical system may be used in the control of substantially all of the optical power transmitted by the system.

The determined optical field amplitude values and the determined optical field phase values are required for each of the plurality of spatial portions of the input optical field and for each of first and second input polarization states to accurately represent light transmission through a medium which randomizes at least phase and polarization. If the optical field amplitude values are not determined for each of the plurality of spatial portions of the input optical field and for each of the first and second input polarization states, this may lead to a loss of optical power and/or to the generation of noise. Such a method may be particularly advantageous for controlling transmission of light through a medium which randomizes phase and polarization such as a medium comprising a multi-mode fiber.

The medium may randomize at least one of the amplitude, phase and polarization of light on transmission through the medium.

The medium may transmit, reflect, absorb, refract, diffract, scatter and/or guide light.

The medium may comprise an optical waveguide which supports one or more guided modes.

The guided modes may have different polarization states.

The medium may transmit, reflect, absorb, refract, diffract, scatter and/or guide different guided modes to different degrees on transmission of the guided mode through the medium.

The medium may introduce random phase delays between different guided modes on transmission of the guided modes through the medium.

The medium may randomize the amplitude, phase and/or polarization of different guided modes on transmission of the guided modes through the medium.

The medium may randomly couple or transfer optical energy between different guided modes on transmission of the guided modes through the medium.

The medium may comprise an optical fiber.

The medium may comprise a multi-mode optical fiber.

The medium may comprise a polarization maintaining fiber.

The medium may comprise a photonic bandgap fiber, a photonic crystal fiber, a Bragg fiber or the like.

The medium may comprise biological tissue.

The medium may comprise one or more colloidal suspensions.

The medium may comprise a diffuser.

The method may comprise controlling the polarization state of the transmitted light entering the medium between the first and second input polarization states.

The method may comprise defining the first and/or second input polarization states to have a deterministic polarization state. The method may comprise defining the first and/or second input polarization states to be linear, circular and/or elliptical polarization states.

The method may comprise defining the first and/or second input polarization states using a polarization controller. For example, the method may comprise defining the first and/or second input polarization states using at least one of a polarizer, a half waveplate, a quarter waveplate, a polarizing beam displacer, a polarizing beam splitter and the like.

The method may comprise controlling the polarization state of the transmitted light entering the medium by controlling the polarization state of the transmitted light at a location offset from an input end of the medium in a direction opposite to a direction of propagation.

The method may comprise controlling the polarization state of the transmitted light entering the medium by selectively directing the transmitted light along a first or a second optical path each of which extends from a given spatial portion of the input optical field to the medium. The first optical path may extend through a polarization controller which operates to provide the light entering the medium with the first input polarization state. The second optical path may by-pass the polarization controller and may enter the medium with the second input polarization state.

At least some of the steps (i) to (v) of the method may be performed in any order. At least some of the steps (i) to (v) of the method may be performed sequentially or may at least partially overlap.

The method may comprise controlling the polarization state of the light transmitted from a given spatial portion of the input optical field between the first and second input polarization states before transmitting light from the next spatial portion of the input optical field.

The method may comprise:

transmitting light from each of the plurality of spatial portions of the input optical field so that the transmitted light enters the medium with the first input polarization state; and then transmitting light from each of the plurality of spatial portions of the input optical field so that the transmitted light enters the medium with the second input polarization state.

The method may comprise:

detecting an intensity of the spatial portion of the polarization component of the optical interference field for each of the plurality of spatial portions of the input optical field and for each of the first and second input polarization states of the transmitted light entering the medium; and then using the detected intensity to determine an optical field amplitude value and an optical field phase value.

Each spatial portion of the input optical field may be contiguous with one or more adjacent spatial portions of the input optical field.

Each spatial portion of the input optical field may be non-overlapping with one or more adjacent spatial portions of the input optical field.

The plurality of spatial portions of the input optical field portions may together constitute a plurality of orthogonal input modes which together provide a basis set for the representation of the input optical field for either one of the first and second input polarization states.

Any arbitrary input optical field may be expressed as a complex superposition of such a plurality of spatial portions of the input optical field.

The number of spatial portions of the input optical field may be greater or equal to a number of optical modes supported by the optical system comprising the medium.

The input optical field may extend laterally relative to a direction of propagation.

The input optical field may extend across a plane.

The input optical field may extend across a plane perpendicular to a direction of propagation.

The input optical field may be located on an input side of the medium.

The input optical field may be offset from an input end of the medium in a direction opposite to a direction of propagation.

The input optical field may be located at an input end of the medium.

The method may comprise selecting a polarization component of the optical interference field.

The polarization component of the optical interference field may have a linear, circular or elliptical polarization state.

The method may comprise selecting the polarization component of the optical interference field using a polarization control apparatus. For example, the method may comprise selecting the polarization component of the optical interference field using at least one of a polarizer, a half waveplate, a quarter waveplate, a polarizing beam displacer, a polarizing beam splitter and the like.

The method may comprise receiving a spatial portion of the output optical field and a spatial portion of the reference optical field on the same receiver. In other words, the spatial portion of the optical interference field may be considered as the superposition of a spatial portion of the output optical field with a corresponding spatial portion of the reference optical field.

The spatial portion of the output optical field may be selected from of a plurality of spatial portions of the output optical field which together define the output optical field.

The spatial portion of the output optical field may be contiguous with one or more adjacent spatial portions of the output optical field.

The spatial portion of the output optical field may be non-overlapping with one or more adjacent spatial portions of the output optical field.

The plurality of spatial portions of the output optical field may constitute a plurality of output modes which together provide a basis set for the representation of the polarization component of the output optical field.

The plurality of spatial portions of the output optical field may constitute a plurality of orthogonal output modes which together provide a basis set for the representation of the polarization component of the output optical field.

Each spatial portion of the output optical field may have an intensity and/or phase distribution which is dictated by any physical limitations imposed by an optical system used to implement the method. For example, each spatial portion of the output optical field may have an Airy disc profile which is dictated by the optical properties such as the numerical aperture of the optical system.

The output optical field may be expressed as a complex superposition of the plurality of spatial portions of the output optical field.

The number of spatial portions of the output optical field may be greater or equal to a number of optical modes supported by the optical system comprising the medium. If the number of spatial portions of the input optical field and the number of spatial portions of the output optical field are equal to the number of optical modes supported by the optical system, this may ensure that the transformation of the optical system is unitary. Such a transformation may be used to control substantially all of the optical power transmitted by the system.

The output optical field may extend laterally relative to a direction of propagation.

The output optical field may extend across a plane.

The output optical field may extend across a plane perpendicular to a direction of propagation.

The output optical field may be offset from an output end of the medium in the direction of propagation.

The output optical field may be located at an output end of the medium.

The method may comprise detecting a variation in the intensity of the spatial portion of the polarization component of the optical interference field for a given spatial portion of the input optical field and for a given input polarization state whilst varying a phase applied to the given spatial portion of the input optical field.

The method may comprise determining the optical field amplitude value and the optical field phase value for the given spatial portion of the input optical field and for the given input polarization state from the detected variation in the intensity of the spatial portion of the polarization component of the optical interference field as a function of the phase applied to the spatial portion of the input optical field.

The method may comprise determining the optical field amplitude value for the given spatial portion of the input optical field and the given input polarization state from the amplitude of the detected variation in the intensity of the spatial portion of the polarization component of the optical interference field as a function of the phase applied to the given spatial portion of the input optical field. The determined optical field amplitude value may be the amplitude of the detected variation in the intensity of the spatial portion of the polarization component of the optical interference field as a function of the phase applied to the given spatial portion of the input optical field.

The method may comprise determining the optical field phase value for the given spatial portion of the input optical field and the given input polarization state from the value of the phase applied to the given spatial portion of the input optical field which corresponds to a distinguishable feature in the detected variation in the intensity of the spatial portion of the polarization component of the optical interference field as a function of the phase applied to the given spatial portion of the input optical field.

The determined optical field phase value may be the value of the phase applied to the given spatial portion of the input optical field which corresponds to the distinguishable feature in the detected variation in the intensity of the spatial portion of the polarization component of the optical interference field as a function of the phase applied to the given spatial portion of the input optical field.

The method may comprise transmitting a spatial portion of the input optical field along a reference path to form the reference optical field.

The reference path may be external to the medium.

The reference path may be non-randomizing with respect to amplitude, phase and/or polarization.

When the reference path randomizes amplitude, phase and/or polarization this may lead to spatial and/or temporal variations in the amplitude, phase and/or polarization of the reference optical field. Such variation may, in turn, also lead to inaccuracies in the determined optical field amplitude and phase values. Furthermore, for the case of a reference path which passes through a medium which randomizes phase and/or polarization such as a multi-mode fiber, the reference optical field may exhibit a speckle pattern having both relatively bright and relatively dark portions. Detecting the optical interference field formed from such a reference optical field and the output optical field may require a high dynamic range optical detector which is capable, in particular, of detecting those portions of the optical interference field which correspond to the dark portions of the reference optical field. This may be undesirable or difficult in practice. In contrast, the use of a reference path which is non-randomizing or deterministic with respect to amplitude, phase and/or polarization may overcome such limitations associated with a randomizing reference path.

The reference path may extend through the medium. Such a method may be used when it is not possible or not practical to provide a reference path external to the medium.

The method may comprise stabilizing the reference path.

The method may comprise phase stabilizing the reference path.

The method may comprise stabilizing a length and/or a refractive index of the reference path.

The method may comprise controlling the environment of the reference path. For example, the method may comprise fixing the reference path and/or isolating the reference path from vibrations, air currents and the like. The method may comprise controlling the temperature of the reference path.

The method may comprise measuring any phase changes induced in the reference path.

The method may comprise using any measured reference path phase changes to correct values of the determined amplitude and/or phase of the polarization component of the output optical field portion.

The reference path may extend through a reference medium.

The reference path may extend through an optical waveguide.

The reference path may extend through a single-mode optical waveguide.

The use of a single mode optical waveguide reference path may serve to reduce or at least substantially eliminate random phase changes which may otherwise occur in a multi-mode optical waveguide reference path due to mode coupling.

The reference path may extend through an optical fiber.

The reference path may extend through a single mode optical fiber.

The reference path may extend through a polarization maintaining fiber.

The reference path may extend through a photonic bandgap fiber, a photonic crystal fiber, a Bragg fiber or the like.

The method may comprise determining a first complex transformation from the determined optical field amplitude values and the determined optical field phase values for each of the spatial portions of the input optical field and the first input polarization state.

The method may comprise determining a second complex transformation from the determined optical field amplitude values and the determined optical field phase values for each of the spatial portions of the input optical field and the second input polarization state.

The method may comprise determining a complex modulation function for the polarization component of the output optical field by performing a complex superposition of the determined first and second complex transformations for each of the spatial portions of the input optical field.

The method may comprise applying a phase change to each of the spatial portions of the input optical field and selecting the input polarization state of each of the spatial portions of the input optical field according to the complex modulation function so as to create a spatial portion of a polarization component of an output optical field which matches a spatial portion of a target output optical field having a target amplitude, a target phase and a target polarization state.

The method may comprise applying an attenuation to each of the spatial portions of the input optical field according to the complex modulation function so as to create a spatial portion of a polarization component of an output optical field which matches a spatial portion of a target output optical field having a target amplitude, a target phase and a target polarization state.

The method may comprise detecting an intensity of each of a plurality of spatial portions of the polarization component of the optical interference field for each of the plurality of spatial portions of the input optical field and for each of the first and second input polarization states.

The method may comprise using the detected intensities to determine a value of an optical field amplitude and a value of an optical field phase for each of the plurality of spatial portions of the polarization component of the optical interference field, for each of the plurality of spatial portions of the input optical field and for each of the first and second input polarization states.

The method may comprise using the determined optical field amplitude values and the determined optical field phase values for each of the plurality of spatial portions of the polarization component of the optical interference field, for each of the plurality of spatial portions of the input optical field and for each of the first and second input polarization states to create an output optical field which matches a target output optical field having a target spatial distribution of amplitudes, a target spatial distribution of phases and a target spatial distribution of polarization states.

Such a method may be used to create an output optical field portion having any desired output polarization state and any desired amplitude and/or phase within any physical limitations imposed by an apparatus used to implement the method. As such, the method may be used to provide full control of the amplitude, phase and/or polarization of light transmitted through a medium which randomizes the amplitude, phase and/or polarization of light on transmission through the medium.

The method may comprise applying an optimization algorithm to enhance a match between an intensity distribution of the created output optical field and an intensity distribution of the target output optical field.

The method may comprise applying a Gerchberg-Saxton (GS) algorithm to enhance the match between the intensity distribution of the created output optical field and the intensity distribution of the target output optical field.

The use of the GS algorithm may mathematically optimize an accuracy of the match between the intensity distribution of the created output optical field and a target output optical intensity distribution. The use of the GS algorithm in this way does not require the implementation in hardware of any physical feedback.

The method may comprise shaping an optical field.

The method may comprise transforming an input optical field on an input side of a medium to an output optical field on an output side of the medium.

The method may comprise detecting a variation in the intensity of a spatial portion of the polarization component of the optical interference field and a spatial portion of a further polarization component of the optical interference field for a given spatial portion of the input optical field and for a given input polarization state whilst varying a phase applied to the given spatial portion of the input optical field, wherein the polarization component of the optical interference field and the further polarization component of the optical interference field have orthogonal polarization states.

The method may comprise determining an optical field amplitude value and an optical field phase value for the given spatial portion of the input optical field and the given input polarization state from the detected variation in the intensity of the spatial portion of the polarization component of the optical interference field and the spatial portion of the further polarization component of the optical interference field as a function of the phase applied to the given spatial portion of the input optical field.

The method may comprise using the determined optical field amplitude values and the determined optical field phase values for each spatial portion of the input optical field, for each of the first and second input polarization states and for each of the polarization component and the further polarization component of the optical interference field to create a spatial portion of the output optical field which matches a spatial portion of a target output optical field having a target amplitude, a target phase and a target polarization state.

The method may comprise detecting an intensity of each of a plurality of spatial portions of the polarization component of the optical interference field and of each of a plurality of spatial portions of the further polarization component of the optical interference field, for each of the plurality of spatial portions of the input optical field and for each of the first and second input polarization states.

The method may comprise using the detected intensities to determine a value of an optical field amplitude and a value of an optical field phase for each of the plurality of spatial portions of the polarization component of the optical interference field and each of the plurality of spatial portions of the further polarization component of the optical interference field, for each of the plurality of spatial portions of the input optical field and for each of the first and second input polarization states.

The method may comprise using the determined optical field amplitude values and the determined optical field phase values for each of the plurality of spatial portions of the input optical field, for each of the first and second input polarization states and for each of the plurality of spatial portions of the polarization component and the further polarization component of the optical interference field to create an output optical field which matches a target output optical field having a target spatial distribution of amplitudes, a target spatial distribution of phases and a target spatial distribution of polarization states.

The method may comprise applying an optimization algorithm to enhance a match between an intensity distribution of the created output optical field and an intensity distribution of the target output optical field.

The method may comprise applying a Gerchberg-Saxton (GS) algorithm to enhance the match between the intensity distribution of the created output optical field and the intensity distribution of the target output optical field.

The method may comprise shaping an optical field.

The method may comprise transforming an input optical field on an input side of a medium to an output optical field on an output side of the medium.

The method may comprise producing an image on one side of the medium of an object located on an opposite side of the medium.

The method may comprise producing an image on one side of a multi-mode fiber of an object located on an opposite side of the multi-mode fiber.

The method may comprise optically trapping a particle suspended in a liquid medium.

The method may comprise:
determining a target output optical field required to optically trap the particle in the medium; and
using the determined optical field amplitude values and the determined optical field phase values for each of the plurality of spatial portions of the input optical field, for each of the first and second input polarization states and for each spatial portion of the polarization component of the optical interference field to create an output optical field which matches the target output optical field.

The method may comprise:
determining a target output optical field required to optically trap the particle in the medium; and
using the determined optical field amplitude values and the determined optical field phase values for each of the plurality of spatial portions of the input optical field, for each of the first and second input polarization states and for each spatial portion of the polarization component and the further polarization component of the optical interference field to create an output optical field which matches the target output optical field.

The method may comprise optically manipulating a particle suspended in a liquid medium.

The method may comprise:
determining a moving target output optical field required to optically manipulate the particle in the medium; and
using the determined optical field amplitude values and the determined optical field phase values for each of the plurality of spatial portions of the input optical field, for each of the first and second input polarization states and for each spatial portion of the polarization component of the optical interference field to create a moving output optical field which matches the moving target output optical field.

The method may comprise:
determining a moving target output optical field required to optically manipulate the particle in the medium; and
using the determined optical field amplitude values and the determined optical field phase values for each of the plurality of spatial portions of the input optical field, for each of the first and second input polarization states and for each spatial portion of the polarization component and the further polarization component of the optical interference field to create a moving output optical field which matches the moving target output optical field.

The method may comprise nanosurgery.

The method may comprise optically lysing a plurality of cells in a liquid medium.

The method may comprise optically transfecting a plurality of cells in a liquid medium.

According to a second aspect of the present invention there is provided a method for use in controlling light transmission through a medium comprising the steps of:

(i) transmitting light from a single spatial portion of an input optical field through the medium to create an output optical field;

(ii) transmitting light from the single spatial portion of the input optical field along a reference path external to the medium to create a reference optical field;

(iii) superposing the output optical field with the reference optical field to create an optical interference field;

(iv) detecting an intensity of a spatial portion of a polarization component of the optical interference field;

(v) using the detected intensity to determine a value of an optical field amplitude and a value of an optical field phase; and (vi) repeating steps (i) to (v) for each of a plurality of spatial portions of the input optical field.

The method may comprise performing steps (i) and (ii) simultaneously.

Such a method may be used to characterize an optical system comprising at a medium which is randomizing with respect to amplitude and phase but which is non-randomizing with respect to polarization.

Such a method may be used in controlling the amplitude and/or phase of a portion of an output optical field by controlling only an input optical field on an input side of the medium.

The method may, in particular, be used in controlling transmission through a randomizing medium which randomizes the amplitude and/or phase but not the polarization of light on transmission through the medium.

The external reference path may be configured to provide a non-random or deterministic change in amplitude, phase and/or polarization.

A non-randomizing or deterministic external reference path may eliminate or substantially suppress random variations in amplitude, phase and/or polarization which may otherwise occur in the reference path so as to eliminate or substantially suppress inaccuracies in the determined optical field amplitude and phase values. A non-randomizing or deterministic external reference path may also eliminate any requirement for a high dynamic range optical detector which may otherwise be required for measurements of an optical interference field created by interfering the output optical field with a reference optical field created on transmission of light along a reference path which is randomizing in amplitude, phase and/or polarization.

Such a method may be used to provide a spatial portion of a target output optical field having any desired amplitude and/or phase within any physical limitations imposed by an apparatus used to implement the method when the medium is non-randomizing with respect to polarization.

The method may comprise repeating steps (i) to (v) for each of first and second orthogonal input polarization states of the transmitted light entering the medium.

Such a method may be used in the control of light transmission through a randomizing medium which randomizes the amplitude, phase and/or polarization of light transmitted through the medium.

One or more of the optional features associated with the first aspect may apply alone or in any combination in relation to the second aspect.

According to a third aspect of the present invention there is provided a method for use in controlling light transmission through a medium comprising:

(i) transmitting light from a single spatial portion of an input optical field through the medium to create an output optical field;

(ii) superposing the output optical field with a reference optical field to create an optical interference field;

(iii) detecting an intensity of a spatial portion of a polarization component of the optical interference field;

(iv) using the detected intensity to determine a value of an optical field amplitude and a value of an optical field phase; and (v) repeating steps (i) to (iv) for each of a plurality of spatial portions of the input optical field and for each of a plurality of spatial portions of a polarization component of the optical interference field.

Such a method may be used in the characterization of an optical system comprising the medium.

Such a method may be used in controlling the amplitude and/or phase of an output optical field by controlling only an input optical field on an input side of the medium.

The method may, in particular, be used in controlling transmission through a randomizing medium which randomizes the amplitude and/or phase but not the polarization of light on transmission through the medium.

The method may comprise using the determined optical field amplitude values and the determined optical field phase values to create an output optical field which matches a target output optical field. Such a method may be used to generate a desired target output optical field having a greater spatial extent to the target output optical fields that may be generated using known methods for use in controlling the transmission of light through a medium.

One or more of the optional features associated with the first and/or second aspects may apply alone or in any combination in relation to the third aspect.

According to a fourth aspect of the present invention there is provided an apparatus for use in controlling light transmission through a medium comprising:

a spatial light modulator configured to sequentially transmit light from each of a plurality of spatial portions of an input optical field incident on the spatial light modulator through the medium to create an output optical field;

an input polarization control arrangement configured to sequentially define first and second input polarization states of light entering the medium from each of the plurality of spatial portions of the input optical field;

a beam combining arrangement configured to superpose the output optical field and a reference optical field so as to create an optical interference field;

an output polarization control arrangement configured to select a polarization component of the optical interference field;

an optical detector configured to receive a spatial portion of the polarization component of the optical interference field; and a controller configured:

to control the spatial light modulator so that the spatial light modulator sequentially transmits light from each of the plurality of spatial portions of the input optical field through the medium;

to control the input polarization control arrangement to sequentially define the first and second input polarization states;

to receive detected intensities from the detector; and to use the detected intensities to determine an optical field amplitude value and an optical field phase value.

The apparatus may be used in characterizing an optical system comprising a medium. For example, the apparatus may be used in characterizing an optical system defined between the spatial light modulator and the output optical field.

The apparatus may be used in controlling the amplitude, phase and/or polarization of a spatial portion of an output optical field by controlling only an input optical field on an input side of the medium.

The optical detector may comprise a photodetector, a photodiode, and/or an image sensor such as a charge coupled device (CCD) or a complementary metal oxide semiconductor (CMOS) image sensor or the like.

The controller may comprise a processor such as microprocessor, a computer or the like.

The input polarization control arrangement may comprise at least one of a polarizer, a half waveplate, a quarter waveplate, a polarizing beam displacer, a polarizing beam splitter and the like. The input polarization control arrangement may comprise a polarization controller, a polarization scanner and/or the like.

The input polarization control arrangement may comprise the spatial light modulator. For example, the input polarization control arrangement may comprise the spatial light modulator in combination with a half waveplate, wherein the spatial light modulator is configured to selectively direct light through the half waveplate to control polarization.

The spatial light modulator may be configured to split an initial beam of light into a measurement beam which defines the input optical field and a reference beam which defines a reference optical field.

The initial light beam, the measurement light beam and/or the reference light beam may comprise plane waves.

The initial light beam, the measurement light beam and/or the reference light beam may have a defined spatial extent in a plane lateral to a direction of propagation.

The apparatus may be configured to interfere the output optical field with the reference optical field to generate an interference field at the optical detector.

The spatial light modulator may be configured to transmit the reference beam along a reference path.

The reference path may be non-randomizing with respect to amplitude, phase and/or polarization.

The reference path may be external to the medium.

The reference path may comprise an optical waveguide.

The reference path may comprise a single mode optical waveguide.

The reference path may comprise may comprise an optical fiber.

The reference path may comprise may comprise a single mode fiber.

The output polarization control arrangement may be configured to select a further polarization component of the optical interference field, wherein the further polarization component of the optical interference field has a polarization state which is orthogonal to a polarization state of the polarization component of the optical interference field.

The output polarization control arrangement may be configured to spatially separate the output optical field portion into the polarization component and the further polarization component.

The controller may be configured to control the spatial light modulator according to the determined optical field amplitude and phase values for the spatial portion of the polarization component of the optical interference field and/ or for the spatial portion of the further polarization component of the optical interference field to create a spatial portion of an output optical field which matches a spatial portion of a target output optical field.

The output polarization control arrangement may comprise at least one of a polarizer, a half waveplate, a quarter waveplate, a polarizing beam displacer, a polarizing beam splitter and the like. The output polarization control arrangement may comprise a polarization controller, a polarization scanner and/or the like.

The optical detector may be configured to measure an intensity of the interference field.

The apparatus may be configured to measure a variation in intensity of the spatial portion of the polarization component of the optical interference field and/or a variation in intensity of the spatial portion of the further polarization component of the optical interference field using the optical detector as the phase applied to each spatial portion of the input optical field is varied sequentially by the spatial light modulator for each of the first and second input polarization states The apparatus may be configured to determine the optical field amplitude and phase values for the spatial portion of the polarization component of the optical interference field and/or for the spatial portion of the further polarization component of the optical interference field from the variation in the intensity of the optical interference field measured using the optical detector as the phase applied to each spatial portion of the input optical field is varied sequentially by the spatial light modulator for each of the first and second input polarization states.

The reference path may extend through the medium.

The reference path may be internal to the medium.

The reference path may be stabilized. The apparatus may be configured to control the environment of the reference path. For example, the apparatus may be configured to fix the reference path and/or isolate the reference path from vibrations, air currents and the like. The apparatus may be configured to control the temperature of the reference path.

The apparatus may be configured to measure any amplitude and/or phase changes induced in the reference path. For example, the apparatus may be configured to simultaneously transmit two different portions of the reference light beam along the reference path using the SLM whilst interrupting transmission of a light measurement beam through the medium. Operating the apparatus in this way may generate a reference interference field at the optical detector.

The apparatus may be configured to repeatedly determine the amplitude and phase of the reference interference field to permit any amplitude and/or phase changes associated with the reference path to be determined. For example, the apparatus may be configured to determine the amplitude and phase of the reference interference field to permit any amplitude and/or phase changes associated with the reference path to be determined before, after and/or between measurements of the output interference field generated when light is transmitted through the medium. The controller may be configured to use any determined amplitude and/or phase changes associated with the reference path to adjust or correct the amplitude and phase of the polarization component of the output optical field portion determined from the output interference field generated when light is transmitted through the medium.

The apparatus may comprise a light source. The apparatus may comprise a coherent light source such as a light emitting diode, a laser or the like. The light source may have a linewidth which is linked with the length of the multimode fiber used. A smaller linewidth may be required for a longer length of fiber. The light source may be wavelength stabilized. The light source may be temperature stabilized for wavelength stabilization. The light source may generate light having a defined polarization state such as a linear, circular or elliptical polarization state.

The apparatus may comprise one or more optical elements for managing the propagation of light between the light source, the medium, the input polarization control arrangement, the output polarization control arrangement, the spatial light modulator and/or the optical detector. For example, the apparatus may comprise one or more lenses, mirrors and/or beam splitters such as one or more polarizing or non-polarizing beam splitters.

One or more of the optional features associated with any of the first to third aspects may apply alone or in any combination in relation to the fourth aspect.

According to a fifth aspect of the present invention there is provided an apparatus for use in controlling light transmission through a medium comprising:

a spatial light modulator configured to simultaneously transmit light from a spatial portion of an input optical field incident on the spatial light modulator through the medium to create an output optical field and to transmit light from the spatial portion of the input optical field along a reference path which is external to the medium to create a reference optical field, sequentially for each of a plurality of spatial portions of the input optical field;

a beam combining arrangement configured to superpose the output optical field and the reference optical field so as to create an optical interference field;

an output polarization control arrangement configured to select a polarization component of the optical interference field;

an optical detector configured to receive a spatial portion of the polarization component of the optical interference field; and a controller configured:

to control the spatial light modulator so that the spatial light modulator sequentially transmits light from each of the plurality of spatial portions of the input optical field through the medium;

to receive detected intensities from the detector; and to use the detected intensities to determine an optical field amplitude value and an optical field phase value.

The apparatus may be used in characterizing an optical system comprising the medium. For example, the apparatus may be used in characterizing an optical system defined between the spatial light modulator and the output optical field.

Such an apparatus may be used in controlling the amplitude and/or phase of a portion of an output optical field by controlling only an input optical field on an input side of the medium.

The external reference path may be configured to provide a non-random or deterministic change in amplitude, phase and/or polarization.

A non-randomizing or deterministic external reference path may eliminate or substantially suppress random variations in amplitude, phase and/or polarization which may otherwise occur in the reference path so as to eliminate or substantially suppress inaccuracies in the determined amplitude and phase of the output optical field portion because the amplitude and phase of the output optical field are determined relative to the amplitude and phase of the reference optical field. A non-randomizing or deterministic external reference path may also eliminate any requirement for a high dynamic range optical detector which may otherwise be required for measurements of an optical interference field created by interfering the output optical field portion with the reference optical field for a reference path which is randomizing in amplitude, phase and/or polarization.

The apparatus may be used to provide an output optical field portion having any desired amplitude and/or phase within any physical limitations imposed by an apparatus used to implement the method when the medium is non-randomizing with respect to polarization.

The apparatus may comprise an input polarization control arrangement configured to sequentially define first and second input polarization states of light entering the medium from each of the plurality of spatial portions of the input optical field.

The control may be configured to control the input polarization control arrangement to sequentially define the first and second input polarization states.

One or more of the optional features associated with any of the first to fourth aspects may apply alone or in any combination in relation to the fifth aspect.

According to a sixth aspect of the present invention there is provided an apparatus for use in controlling light transmission through a medium comprising:

a spatial light modulator configured to sequentially transmit light from each of a plurality of spatial portions of an input optical field incident on the spatial light modulator through the medium to create an output optical field;

a beam combining arrangement configured to superpose the output optical field and a reference optical field so as to create an optical interference field;

an output polarization control arrangement configured to select a polarization component of the optical interference field;

an optical detector configured to receive a plurality of spatial portions of a polarization component of the optical interference field; and a controller configured:
to control the spatial light modulator so that the spatial light modulator sequentially transmits light from each of the plurality of spatial portions of the input optical field through the medium;
to receive detected intensities from the detector; and
to use the detected intensities to determine optical field amplitude values and optical field phase values.

The optical detector may comprise an array of sensor elements, pixels or the like.

Such an apparatus may be used in the characterization of an optical system comprising the medium. For example, the apparatus may be used in characterizing an optical system defined between the spatial light modulator and the output optical field.

Such an apparatus may be used in controlling the amplitude and/or phase of an output optical field by controlling only an input optical field on an input side of the medium.

The apparatus may, in particular, be used in controlling transmission through a randomizing medium which randomizes the amplitude and/or phase but not the polarization of light on transmission through the medium.

The apparatus may be used to determine the amplitudes and phases of each of a plurality of portions of the input optical field to create an output optical field which matches a target output optical field. Such an apparatus may be used to generate a desired target output optical field having a greater spatial extent to the target output optical fields that may be generated using a known apparatus for use in controlling the transmission of light through a medium.

The apparatus may an input polarization control arrangement configured to sequentially define first and second polarization states of light entering the medium from each of the plurality of spatial portions of the input optical field.

The controller may be configured to control the input polarization control arrangement to sequentially define the first and second input polarization states.

One or more of the optional features associated with any of the first to fifth aspects may apply alone or in any combination in relation to the sixth aspect.

According to a seventh aspect of the present invention there is provided a method for use in controlling light transmission through a medium comprising:

sequentially determining an amplitude and a phase of a polarization component of a portion of an output optical field on an output side of the medium for each of a plurality of portions of an input optical field on an input side of the medium and for each of first and second orthogonal input polarization states of the input optical field portions. The plurality of input optical field portions may define the input optical field.

One or more of the optional features associated with any of the first to sixth aspects may apply alone or in any combination in relation to the seventh aspect.

According to an eighth aspect of the present invention there is provided an apparatus for use in controlling light transmission through a medium comprising:

a spatial light modulator configured to define an input optical field on an input side of the medium;

an input polarization control arrangement configured to sequentially define first and second input polarization states of the input optical field;

an optical detector configured to receive a polarization component of a portion of an output optical field on an output side of the medium; and a controller configured to determine an amplitude and a phase of the polarization component of the output optical field portion from measurements performed by the optical detector as each of the plurality of input optical field portions are sequentially transmitted through the medium by the spatial light modulator for each of the first and second input polarization states.

One or more of the optional features associated with any of the first to seventh aspects may apply alone or in any combination in relation to the eighth aspect.

BRIEF DESCRIPTION OF THE DRAWINGS

The present invention will now be further described by way of non-limiting example only with reference to the accompanying drawings of which:

FIG. 4 is a pictorial representation of the construction of a complex modulation function for a spatial light modulator determined for a single output mode and an s-polarized output polarization component;

DETAILED DESCRIPTION OF THE DRAWINGS

Figure 1:
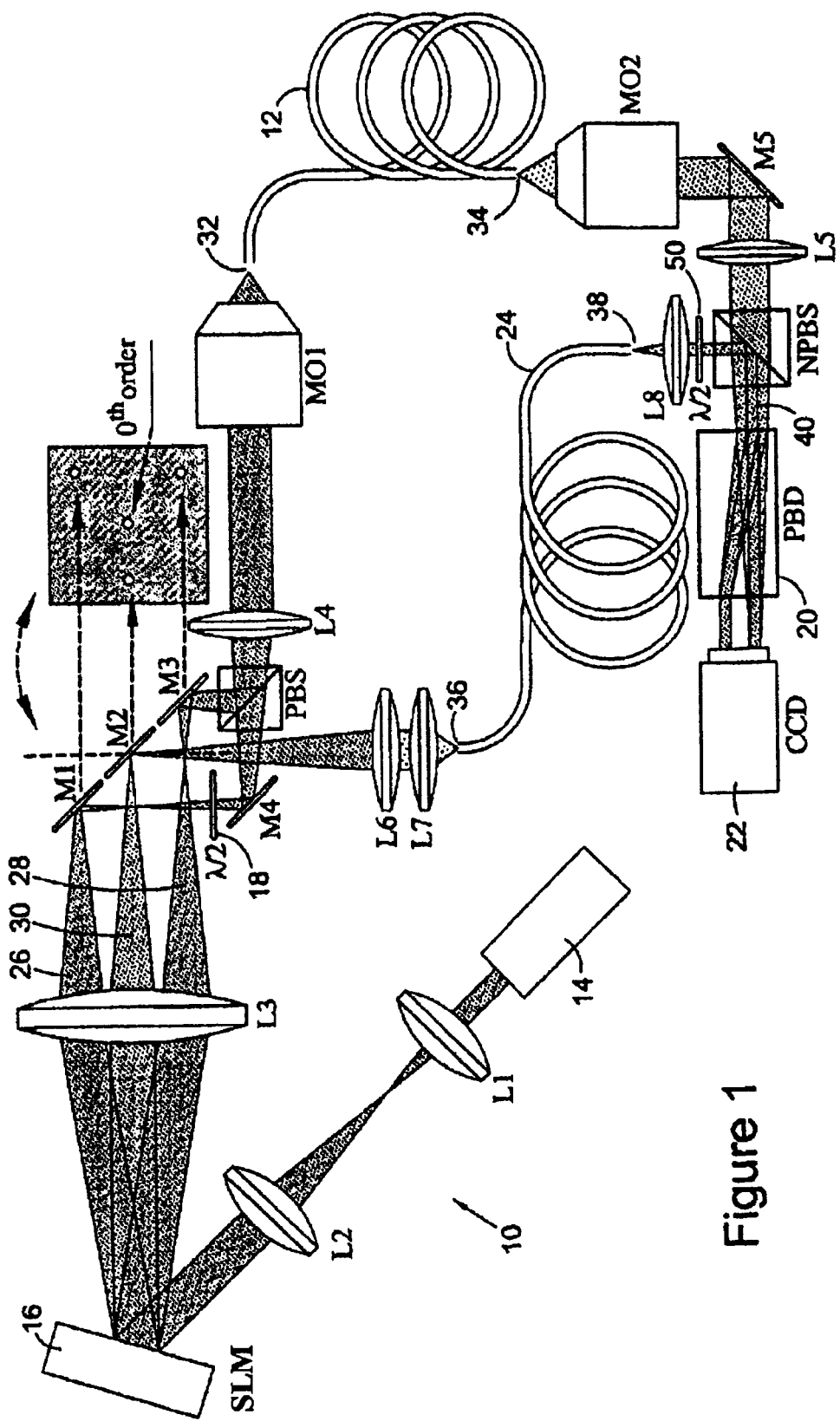
FIG. 1 is a schematic of an apparatus for use in controlling the transmission of light through a medium.

Referring initially to FIG. 1 there is provided an apparatus generally designated 10 for use in controlling the transmission of light through a medium comprising a multi-mode fiber (MMF) 12 having a core diameter of 50 µm and cladding diameter of 125 µm, with NA of 0.22. The apparatus 10 comprises a laser light source 14 configured to provide single-frequency, near infrared linearly polarized light at a wavelength of 1064 nm, a spatial light modulator (SLM) 16 having a resolution of 512×512 pixels and a high refresh-rate exceeding 100 Hz, an input polarization control arrangement comprising a half-wave plate 18, an output polarization control arrangement comprising a polarization beam displacer (PBD) 20 and an optical detector in the form of a charge coupled device (CCD) image sensor 22.

The MMF 12 allows approximately 400 propagating modes. The length of the MMF 12 used is 1 m. One skilled in the art should understand that, apart from the requirements on laser performance (narrow bandwidth of <100 kHz and wavelength stability), there is no fundamental disadvantage associated with the use of longer MMF lengths.

The apparatus comprises a reference medium in the form of a single mode fiber (SMF) 24.

The apparatus further comprises several beam management elements in the form of lenses L1 to L8, mirrors M1 to M5, a polarizing beam splitter (PBS), a non-polarizing beam splitter (NPBS) and microscope objectives MO1 (20×0.42 NA) and MO2 (20×, 0.40 NA).

In use, linearly polarized light from the laser light source 14 is expanded by a telescope (L1=150 mm and L2=300 mm) and directed onto an active area of the SLM 16. The SLM 16 is configured to transmit any light incident thereon along a first path 26, a second path 28 or a reference path 30. The paths 26, 28 and 30 are separated in the Fourier plane of the lens L3 (f=400 mm) by mirrors M1 and M3. The polarization of light in the first path 26 is rotated by 90° by half-wave plate 18 and merged with light in the second path 28 by polarizing beam-splitter PBS. Light travelling along the first path 26 or the second path 28 is imaged onto an input facet 32 of the MMF 12 by a telescope formed by lens L4 (f=200 mm) and microscope objective MO1.

An output facet 34 of the MMF 12 is imaged onto the CCD sensor 22 by the microscope objective MO2 and a tube lens L5 (200 mm). Light in reference path 30 is separated from the Fourier plane by the mirror M2 and coupled into an input 36 of the SMF 24 by lenses L6 (f=200 mm) and L7 (aspherical f=15 mm, NA=0.5). A beam at an output 38 of the SMF 24 is collimated by lens L8 (aspherical, f=8 mm) and merged with light from the MMF 12 at non-polarizing beam-splitter NPBS to form a merged beam 40. Light output from the SMF 24 has the form of a collimated Gaussian beam with a very uniform intensity distribution over an area exceeding an image of the SMF output 38 and has a flat wavefront. Before the merged beam 40 reaches the CCD sensor 22, first and second orthogonal output polarization components of the merged beam 40 are separated by PBD 20 creating two output images at two separate regions of the CCD sensor 22. The SLM 16 is configurable so as to transmit a portion of light along the reference path 30 at the same time as transmitting a portion of light along the first path 26 or the second path 28 so as to create an optical interference field at each of the separate regions of the CCD sensor 22.

The apparatus 10 comprises a further half-wave plate 50 in the reference path 30 between the output 38 of the SMF 24 and the non-polarizing beam splitter NPBS. The further half-wave plate 50 is adjusted to ensure that the PBD 20 divides light which has been transmitted along the reference path through the SMF 24 evenly between the two separate regions of the CCD sensor 22.

The CCD sensor 22 is calibrated to identify corresponding pixels of the two output images on the CCD sensor 22. In practice, this comprises adjusting the half-wave plate 18 to ensure that an optical field at the output 34 of the MMF 12 has first and second orthogonal output polarization components which are separated by the PBD 20 to create the two output images at the two separate regions of the CCD sensor 22. The two CCD images are then compared to identify corresponding pixels and this information is used throughout the system characterization and output optical field optimization procedures described below.

Figure 2:
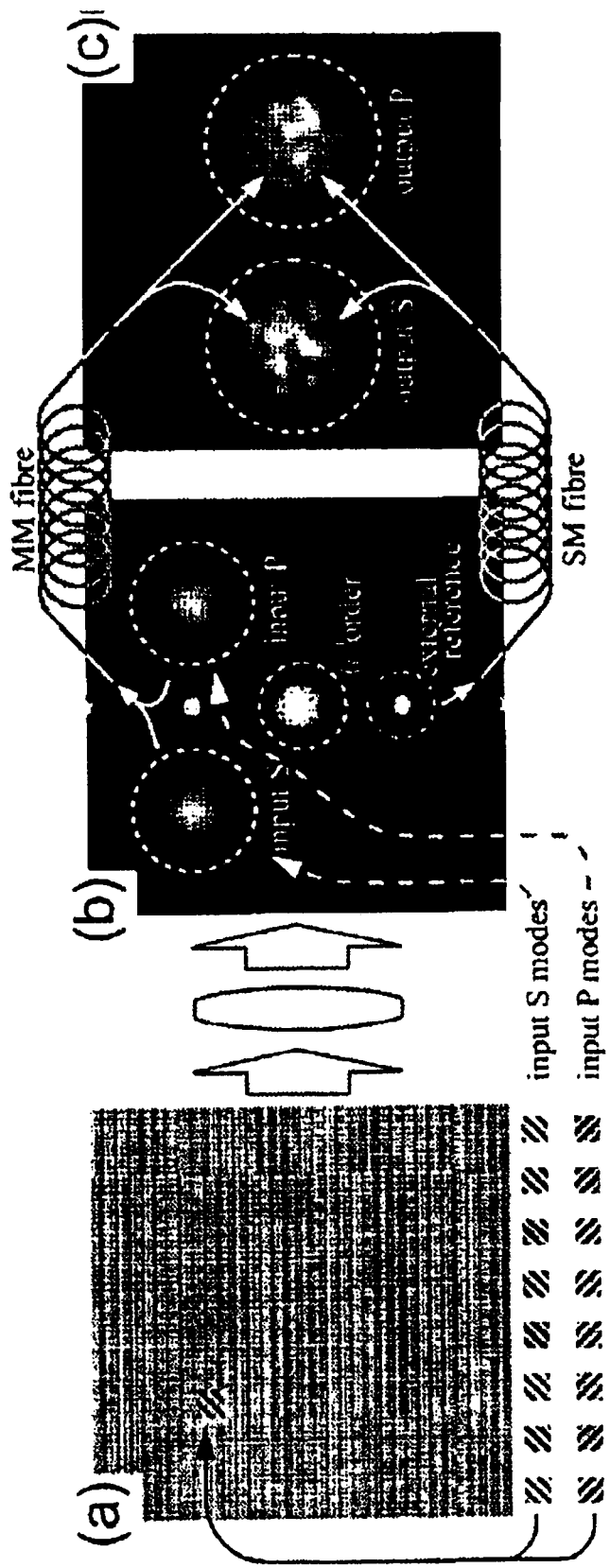
FIG. 2(a) schematically illustrates different grating blazes applied at a spatial light modulator for use in controlling the transmission of light through the medium.
FIG. 2(b) shows intensity distributions in Fourier space for the different grating blazes shown in FIG. 2(a)
FIG. 2(c) shows simulated intensity distributions at a CCD sensor resulting from interference between light transmitted through a multi-mode fiber medium and light transmitted along a reference path for the different grating blazes shown in FIG. 2(a)

The SLM active area is split into 64×64 sub-domains each of 8×8 pixels. Any sub-domain of the SLM 16 may be independently configured to send light along the first path 26, the second path 28 or the reference path 30 by applying an appropriate blazed phase grating across the sub-domain. For example, FIG. 2(a) schematically illustrates the use of a single sub-domain blazed to direct light incident thereon along the first path 26. The other sub-domains are all blazed with a different orientation so as to direct light incident thereon along the reference path 30. FIG. 2(b) shows the intensity distributions in Fourier space for grating blazes applied across a single sub-domain so as to direct light from the single sub-domain along the first path 26 (see intensity distribution labeled "input S") and the second path 28 (see intensity distribution labeled "input P"). Also shown in FIG. 2(b) is the intensity distribution in Fourier space for light directed along the reference path 30 from the remaining sub-domains and light travelling in the $0^{th}$ order from the SLM 16. The SLM 16 is configured such that a phase applied at each sub-domain of the SLM 16 may be independently varied. One skilled in the art will appreciate that it is possible to configure a SLM for modulation of the amplitude of the optical field at each sub-domain of the SLM. However, as described below in more detail, the SLM 16 of the apparatus 10 shown in FIG. 1 is configured for phase only modulation.

A method for controlling transmission of light through the MMF 12 comprises characterizing an optical system from an input plane of the SLM 16 to the CCD sensor 22 by decomposing the input optical field incident on the SLM 16 into a plurality of spatial portions each corresponding to a different sub-domain of the SLM 16. For each spatial portion of the input optical field, light is sequentially transferred from its original location in the 0th order area of the Fourier plane into the 1st order S area or the 1st order P area as shown in FIG. 2(b) by sequentially modulating the appropriate sub-domain with an appropriate blazed phase grating. Light is transmitted from a given sub-domain of the SLM to the 1st order S area from which the light is imaged onto the input facet 32 of the MMF 12 through the half-wave plate 18. Light is then transmitted from the given sub-domain of the SLM to the 1st order P area from which it is imaged onto the input facet 32 of the MMF 12 without passing through the half-wave plate 18. Thus, light is transmitted from the appropriate sub-domain of the SLM 16 to the MMF 12 with a first input polarization state and then a second input polarization state orthogonal to the first polarization state.

Light transmitted through the MMF 12 is combined with light transmitted through the SMF 24. The PBD 20 separates the combined beam so as to generate two spatially separated images at the CCD sensor 22. Each image represents a different polarization component of an optical interference field generated by interfering an output optical field created by light transmitted through the MMF 12 and a reference optical field generated by light transmitted through the SMF 24. FIG. 2(c) shows examples of simulated intensity distributions at the CCD sensor 22 for the first input polarization state and second input polarization state corresponding to the same sub-domain of the SLM 16.

Each sub-domain of the SLM 16 is controlled sequentially so as to transmit a corresponding spatial portion of the input optical field one at a time along the first path 26 and then the second path 28. For each spatial portion of the input optical field and for each input polarization state, the phase of the appropriate sub-domain of the SLM 16 is varied. The CCD sensor 22 captures the intensity distribution of both polarization components of the optical interference field for each spatial portion of the input optical field and for each input polarization state as the phase applied by the appropriate sub-domain of the SLM 16 is varied. From the detected intensity distributions, the evolution of the intensity detected by a given pixel of the CCD sensor 22 is determined for a single sub-domain of the SLM 16 while altering the phase applied at the sub-domain. Altering the phase applied at the sub-domain uniformly at a constant rate of υ, the evolution of intensity detected at a pixel of the CCD sensor 22 I(t) follows the relation:

$$I(t) \propto |E_t|^2 + |E_r|^2 + 2|E_t||E_r|\cos(\psi_t - \psi_r + \upsilon t), \quad (1)$$

where $E_t$ and $E_r$ are the output optical fields from the MMF 12 and the SMF 24 respectively. The harmonic term in Equation 1 carries both the relative amplitude and relative phase of a spatial portion of the output optical field for the appropriate input polarization state. The value of the optical interference field amplitude $2|E_t||E_r|$ is stored in a memory of a system controller (not shown). The phase applied at the sub-domain which corresponds to a distinguishable feature such as a peak in the detected oscillations in the intensity of the optical interference field is also stored in the memory. This procedure is repeated for each the spatial portions of the input optical field by altering the phase applied at the corresponding sub-domains of the SLM 16 and for each of the first and second input polarization states.

For improved accuracy of characterization of the optical system between the SLM 16 and the CCD sensor 22, the phase associated with transmission of light through the SMF 24 relative to the pathway of the MMF 12 is determined as part of a calibration procedure performed between measurements for the different spatial portions of the input optical field as follows.

An appropriate blaze is applied to one selected "internal reference" sub-domain of the SLM 16 to direct light along the S pathway 26 (alternatively a sub-domain deflecting light along pathway P 28 could be used but the selection has to be kept for the whole calibration procedure). An appropriate blaze is applied to the remaining sub-domains of the SLM 16 to direct light along the "external reference" path 30. The interference field observed at the CCD sensor 22 is time invariant as long as the difference between the lengths of the two, internal and external reference optical pathways is maintained. Any thermal or mechanical drift that would be harmful for the calibration procedure manifests itself as a change or shift in the observed interference pattern. The phase of the external reference signal is altered to correct for changes in the difference between the lengths of the external and the internal optical pathways by comparing the actual CCD records of the resulting interference field with one obtained when the calibration procedure was initiated.

Alternatively, a gallery of interference fields for a number of different phase differences between the internal and the external reference pathways is taken at the start of the calibration procedure and during the calibration cycle between the measurements of the spatial portions of the input optical field, the current record of the interference field can be compared with each of the frames of the gallery. The frame of best match shows the value of the phase shift that has to be added to the external reference at the SLM 16 to correct for the thermal/mechanical drift of the geometry. The updated value of the external reference phase is used in the measurement of the next spatial portion of the input optical field in the cycle of the calibration procedure.

This intermediate step in the calibration procedure may correct for any mechanical and/or thermal drift of the set-up to maintain a stationary phase relation between the reference path 30 through the SMF 24 and the first and second optical measurement paths 26, 28 through the MMF 12.

The foregoing characterization procedure applies to the characterization of the optical system between the input plane of the SLM 16 and the CCD sensor 22 for a single pixel at the CCD sensor 22. To characterize the whole image at the MMF output facet 34, the same characterization procedure is applied for each of the pixels at the CCD sensor 22. The complete series of optical interference field amplitudes and applied sub-domain phase values for every CCD pixel represents a systematic transformation between the input optical field at the SLM plane and the output optical field at the CCD sensor 22. Since the correlations between the polarization states of the input and output optical fields are a priori unknown, system characterization is performed separately for both polarization components of the output optical field to capture the full parameter space of an optical transformation of the system.

Due to the high SLM refresh-rate, characterization for all the spatial portions of the input optical field for both input polarization states, including calibration of the reference path 30, may take less than one hour in practice. If the CCD sensor 22 is synchronized with the SLM 16, the optimization time may be reduced by 50%.

It should be understood that without input polarization control it is only possible to employ 50% of the available optical power as the remaining light is randomly spread over the area of the MMF output facet 34.

The foregoing characterization procedure is used to determine a transformation of the optical system between the input optical field at the input plane of the SLM 16 and the output optical field at the CCD sensor 22. The input optical field is defined by a plurality of contiguous non-overlapping spatial portions as defined by the SLM sub-domains. The plurality of spatial portions of the input optical field together constitute a plurality of orthogonal input modes which together provide a basis set for the representation of the input optical field.

The output field is defined by a plurality of spatial portions as defined by the CCD pixels. The number of CCD pixels is greater than the number of optical modes supported by the optical system so that the optical system is over-sampled and the transformation of the optical system is non-unitary. However, one skilled in the art will appreciate that the number of CCD pixels may be equal to the number of optical modes supported by the optical system so that the transformation of the optical system is unitary. One skilled in the art will also appreciate that, in practice, a mode at the MMF output facet 34 as imaged onto the CCD sensor 22 has a field distribution which is dictated by the optical properties of the optical system which is used to implement the method. More specifically, as discussed below in relation to FIG. 5, each output mode at the output 34 of the MMF 12 comprises an Airy disc intensity distribution which has a lateral spatial extent which extends beyond a lateral spatial extent of a single CCD pixel. As described below, the transformation of the optical system may be used to control the amplitude, phase and polarization of an optical field at the output 34 of the MMF 12.

Figure 3:
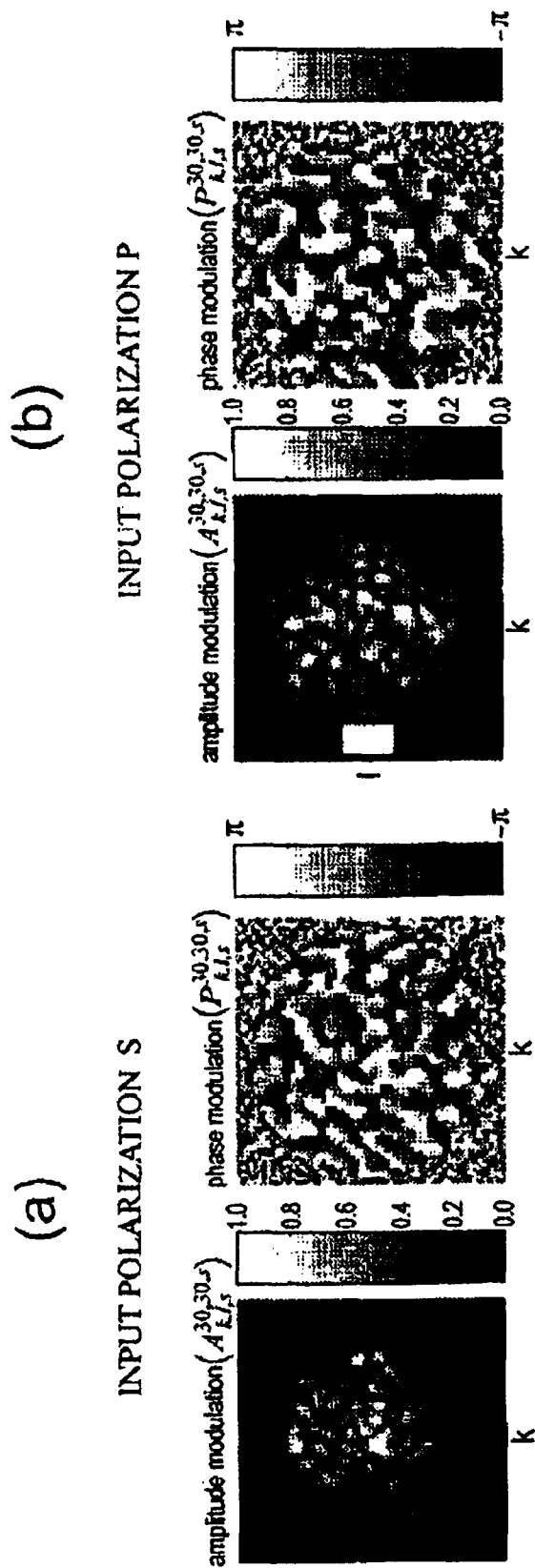
FIG. 3(a) schematically illustrates an example of a complex system transformation function determined for a single output mode and an s-polarized output polarization component for an s-polarized input optical field.
FIG. 3(b) schematically illustrates an example of a complex system transformation function determined for the same output mode and the same s-polarized output polarization component as for FIG. 3(a) but for a p-polarized input optical field.

The transformation of the optical system is given by four modulation functions (phase and amplitude for each input polarization state) of all 64×64 SLM sub-domains for every CCD pixel. During the characterization procedure the intensity signal is analyzed from 120×120 CCD pixels for each of the two output polarization components. Mathematically, the transformation is expressed using six indices as $T_{k,l,m}^{u,v,w}$ where k and l are the position indices of the SLM sub-domains with possible values between 1 and 64, m is the polarization of the spatial portion of the input optical field with two values of S and P, u and v are the position indices of the CCD pixels with values between 1 and 120 and w is the polarization state of the output optical field also with two values of S and P. The transformation is complex and may be represented as $T_{k,l,m}^{u,v,w}=A_{k,l,m}^{u,v,w}\cdot\exp[i\cdot P_{k,l,m}^{u,v,w}]$, where the amplitude $A_{k,l,m}^{u,v,w}$ is the value of the optical interference field amplitude which is determined and stored in the memory of the system controller (not shown) during calibration and the phase $P_{k,l,m}^{u,v,w}$ is the phase value which is determined and stored in the memory of the system controller (not shown) during calibration. $A_{k,l,m}^{u,v,w}$ is a real positive array and $P_{k,l,m}^{u,v,w}$ has real values from the interval $\langle -\pi,\pi \rangle$. An example of the system transformation for a single output mode (u;v;w)=(30;30;s) is shown in FIGS. 3(*a*) and 3(*b*).

Following characterization, the method for controlling the transmission of light through the MMF 12 may comprise generating an output optical field having any arbitrary amplitude, phase and/or polarization within the physical limitations imposed by the optical system. Furthermore, the method may comprise generating a plurality of output modes and combining them to generate a target output optical field having any arbitrary amplitude, phase and/or polarization within the physical limitations imposed by the optical system. In the ideal case, a single output mode would be generated optimally (containing 100% of the available optical power) when all the analyzed input modes are coupled into the MMF 12 with the appropriate amplitude, phase and polarization. During the characterization procedure, the field at the input SLM plane has only a single polarization and the polarization control of input modes is achieved by applying different blazed gratings $G_s$ and $G_p$ within a sub-domain. These blazed grating phase factors also have to be applied when designing the SLM modulation function $N_{k,l}^{u,v,w}$ which is used to set the SLM 16 for creating the desired output optical field:

$$M_{k,l}^{u,v,w}=A_{k,l,s}^{u,v,w}\cdot\exp[i\cdot(P_{k,l,s}^{u,v,w}+G_s)]+ A_{k,l,p}^{u,v,w}\cdot\exp[i\cdot(P_{k,l,p}^{u,v,w}+G_p)] \qquad (2)$$

Figure 4:
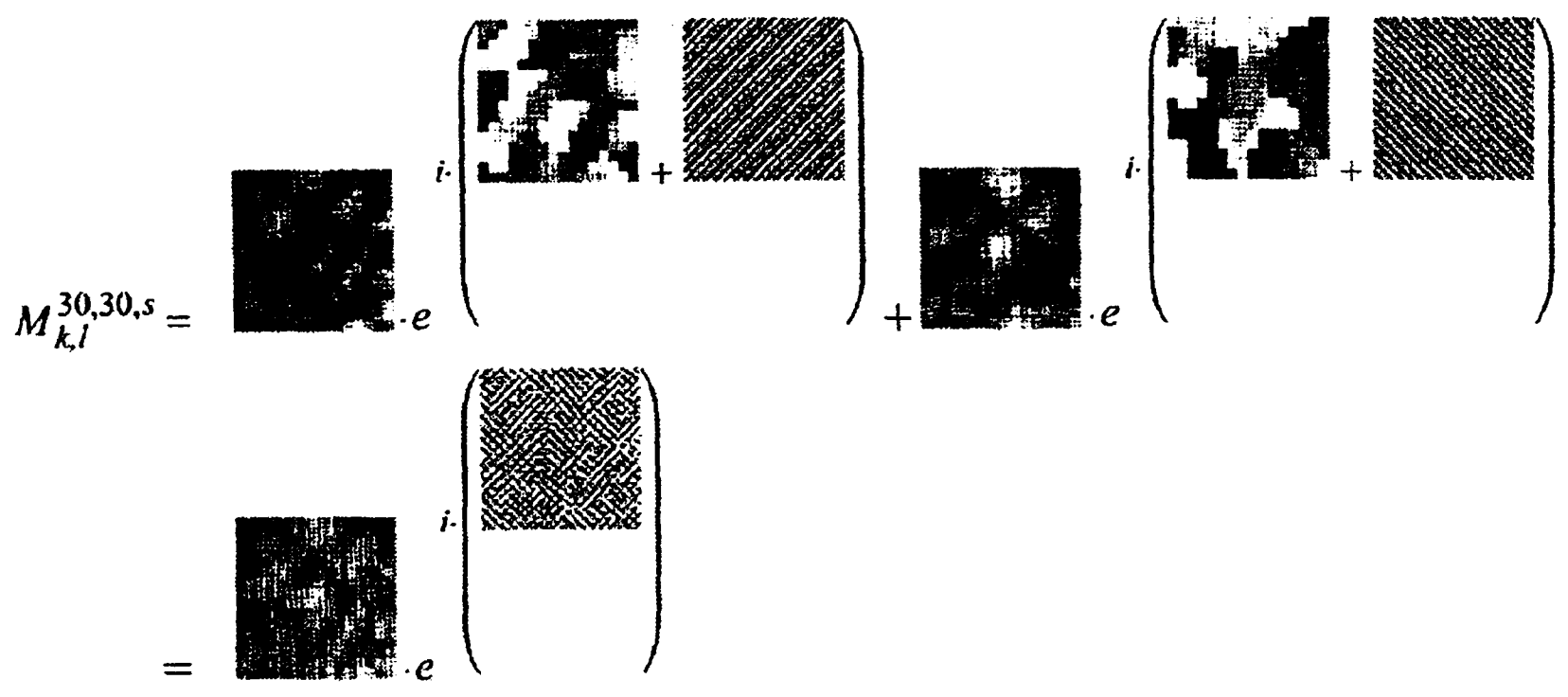

For a better understanding, the modulation for the output mode corresponding to (u;v;w)=(30;30;s) can be demonstrated in image form (selection of only 16×16 input modes) as shown in FIG. 4. In the following text, this will be referred to as a 'complex superposition of input polarizations'. For each output mode, the required SLM modulation has both phase and amplitude distributions. As explained above, the SLM 16 is configured for phase-only modulation. In other words, the SLM 16 is used to modulate only the phase of an input optical field incident upon the SLM 16 according to $\arg[M_{k,l}^{u,v,w}]$. Each sub-domain of the SLM 16 may be configured to distribute the optical power incident thereon between the first and second paths 26, 28 according to the amplitude terms $A_{k,l,s}^{u,v,w}$ and $A_{k,l,p}^{u,v,w}$ of Equation 2 and to apply the phase of the light in each path according to $\arg[M_{k,l}^{u,v,w}]$.

When designing the SLM modulations, the phase transformation $P_{k,l,m}^{u,v,w}$ is essential and when missing, the light output is entirely randomized.

If the input polarization information were missing, i.e. the input modes are only coupled in one polarization state and:

$$M_{k,l}^{u,v,w} = A_{k,l,s}^{u,v,w} \cdot \exp[i \cdot (P_{k,l,s}^{u,v,w} + G_s)] \quad (3)$$

then, on average, control is lost over 50% of the available power (only 50% of input optical modes would constructively interfere at the selected point, reducing the intensity to 25%, but the used 50% of modes carry all of the available power—i.e. their intensity is doubled). The remaining power is randomly spread between other output modes. This is the case for some prior art methods.

If the amplitude terms $A_{k,l,s}^{u,v,w}$ and $A_{k,l,p}^{u,v,w}$ are not used and all the input modes are coupled into the fiber with a constant amplitude:

$$M_{k,l}^{u,v,w} = \exp[i \cdot (P_{k,l,s}^{u,v,w} + G_s)] + \exp[i \cdot (P_{k,l,p}^{u,v,w} + G_p)] \quad (4)$$

Equation 4 is referred to as the 'phase only superposition of input polarizations' and, as demonstrated in Appendix A and B, this has a considerably lower efficiency when compared to the 'complex superposition of input polarizations' (Equation 2) described above. It can be shown that for a very large number of modes propagating in the system, the power efficiency drops to a value of $\pi/4$ i.e. approximately 78.5% with the remaining approximately 21.5% of power randomly spread over other output modes. As the number of modes allowed to propagate within the MMF 12 is limited to approximately 400, variations of the efficiency around the value of $\pi/4$ may be expected with a standard deviation of 2%.

Figure 5:
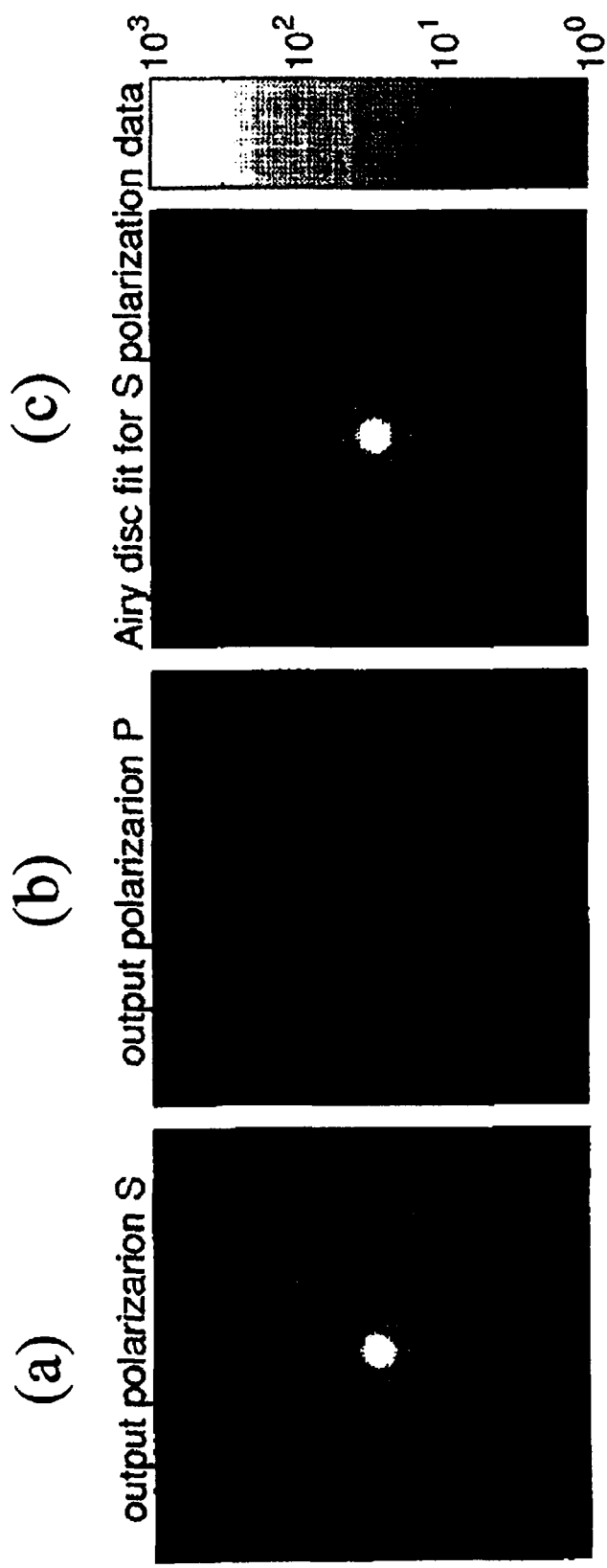
FIG. 5(a) shows an experimental image of an s-polarized polarization component of an output mode.
FIG. 5(b) shows an experimental image of a p-polarized polarization component corresponding to the s-polarized polarization component shown in FIG. 5(a)
FIG. 5(c) shows an experimental image of an optimal fit of the output mode corresponding to the s-polarized polarization component shown in FIG. 5(a)

FIG. 5 shows an example of a generated output optical field using the complex superposition of input polarizations (Equation 2) and when using phase only modulation at the SLM 16. The image data was obtained by merging several CCD frames taken at various exposure times to improve a dynamic range of the measurements. The measured data was fitted for 100 different output modes with an expected Airy disc profile (5 parameter function—centre x, centre y, amplitude, central core diameter and offset). It was determined that the output modes carry on average 83% of the total power transmitted by the MMF 12 with standard deviation of 3%. This is in a good agreement with the value of $\pi/4$, (approximately 78.5%) discussed earlier. The difference is probably caused by a slightly non-linear response of the CCD sensor 22 at different exposure times. The radius of the fitted spot corresponds to value of numerical aperture equal to NA=0.18, that is about 20% smaller compared with value 0.22 given by the fiber manufacturer. This may be caused by Gaussian illumination of the SLM 16, thus reducing intensity of output modes with higher radial coordinates.

Figure 9:
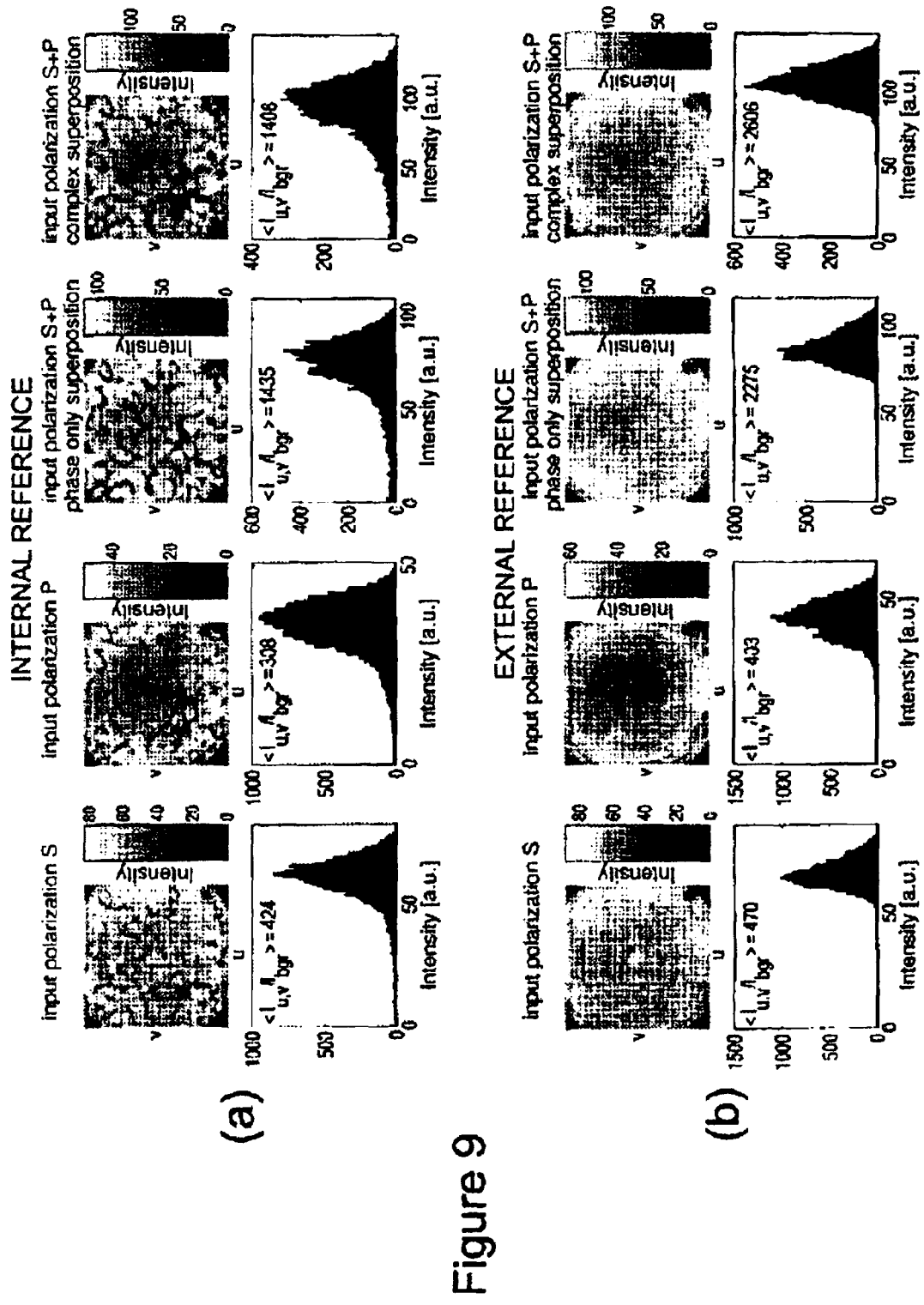
FIG. 9(a) shows a series of experimental images and corresponding intensity histograms of a generated output optical field for different output polarization components when using a reference path internal to a multi-mode fiber medium.
FIG. 9(b) shows a series of experimental images and corresponding intensity histograms of a generated output optical field for different output polarization components when using a reference path external to a multi-mode fiber medium.

Appendix A (FIGS. 9(a) and (b)) presents the overall statistics of the generation of a particular output mode using all the discussed approaches when using phase only modulation at the SLM 16. FIGS. 9(a) and (b) demonstrate that, with the use of the external reference path 30 including the SMF 24, the problematic issue of 'blind spots' associated with an internal reference as used in prior art methods may be eliminated. Furthermore, with the use of both input polarizations, the intensities of the output optical field may be doubled for the same optical power in the system and the signal/noise ratio may be enhanced by factor larger than 6. FIGS. 9(a) and (b) also show that complex superposition of input polarizations may permit the generation of an output mode having more than 20% higher intensity than the phase only superposition of input polarizations.

A skilled person would understand how to construct or synthesize an arbitrary output field having any arbitrary amplitude, phase and/or polarization within the physical limitations imposed by the optical system from a complex superposition of the plurality of output modes. In practice, this comprises determining the amplitude and phase terms of the modulation function $M_{k,l}^{u,v,w}$ for each of the plurality of output modes required to provide a target output field.

The method may comprise splitting the available power to concentrate optical output intensity in a plurality of discrete intensity peaks or spots i.e. to simultaneously generate a required number of output modes. As in the case of combining polarizations, a complex superposition of modulations obtained from Equation 2 is used corresponding to individual modes:

$$M_{k,l}^N = \sum_{q=1}^{N} \sqrt{a_q} \cdot M_{k,l}^{u_q, v_q, w_q} \quad (5)$$

where N is the number of output modes. The required output modes are indexed by variable q. The $a_q$ terms are the required intensity contributions of the composition of output modes. Alternatively, phase only superposition of output modes may be used:

$$M_{k,l}^N = \sum_{q=1}^{N} \sqrt{a_q} \cdot \exp[i \cdot \arg(M_{k,l}^{u_q, v_q, w_q})] \quad (6)$$

A comparison of experimental results for the complex superposition of output modes and the phase only superposition of output modes is provided in Appendix B. These results demonstrate that when complex superposition of output modes is used, there are no power losses and intensity is distributed between the individual spots as required.

Figure 6:
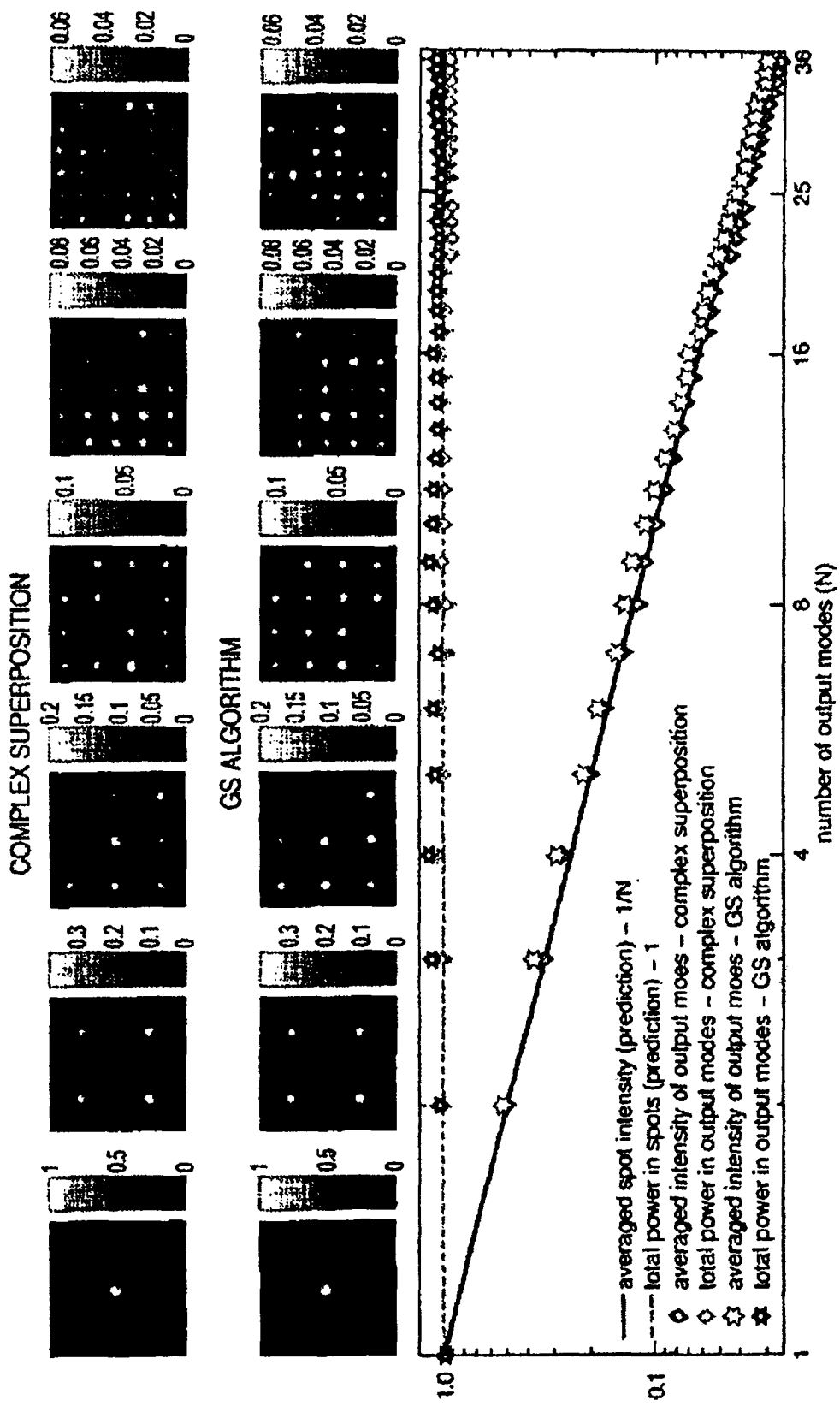
FIG. 6 shows experimental images of output optical field intensities for a varying number of simultaneously generated output modes before and after application of a Gerchberg-Saxton algorithm and the corresponding plots of total power and the average power per output mode as a function of the number of output modes.

The method comprises splitting of the power into a larger number of output modes as demonstrated in FIG. 6 by combining individual output modes by complex superposition and applying a Gerchberg-Saxton (GS) algorithm. This combines individual output modes with phases, such that the resulting SLM modulation has the most uniform amplitude distribution. The GS algorithm is a purely mathematical procedure and hardware feedback is not required to optimize the results. As larger numbers of output modes are generated, they cover a significant fraction of the area of the MMF output 34 and the unused portion of light that is randomly spread starts to contribute to the intensity of individual modes that will manifest themselves as higher intensities there. The data shown in FIG. 6 was corrected by removing the random signal intensity contributions. As can be seen in FIG. 6, use of the GS algorithm results in a larger efficiency (9% on average), a more uniform distribution of power between individual output modes and a power efficiency exceeding 90%.

Figure 7:
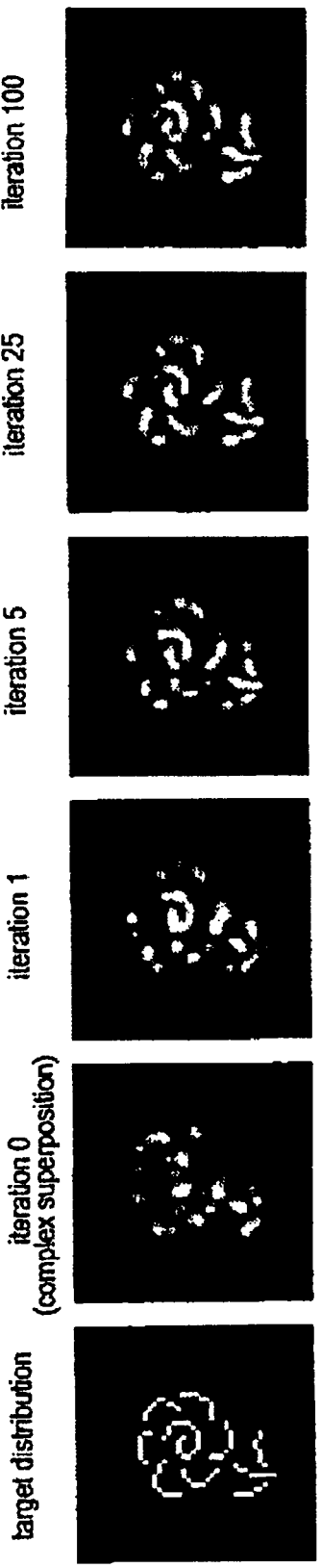
FIG. 7 shows a target output intensity distribution and a series of experimental images showing the evolution of the output optical field intensity distribution for different numbers of iterations of the Gerchberg-Saxton algorithm demonstrating a sequential enhancement of the accuracy of the match between the output optical field intensity distribution and the target output intensity distribution with increasing iterations.

The MMF 12 used to generate the experimental results disclosed herein supports approximately 400 propagating modes. 2×64×64 input and 2×120×120 output modes are used to describe the system transformation. Hence the transformation is highly over-sampled and non-unitary. This is not an issue in any of the applications disclosed herein, but for the purposes of more advanced beam shaping (e.g. generation of an optical vortex) the issue of orthogonality between individual input modes and most importantly, the output modes would need to be addressed. When the output modes are generated in very close proximity to each other, they start to influence themselves by unwanted interference effects. The GS algorithm is however, very useful in these cases, as these interference effects are very strongly suppressed and arbitrary intensity distributions can be generated at the MMF output 34 with very high quality as demonstrated in the FIG. 7.

Figure 8:
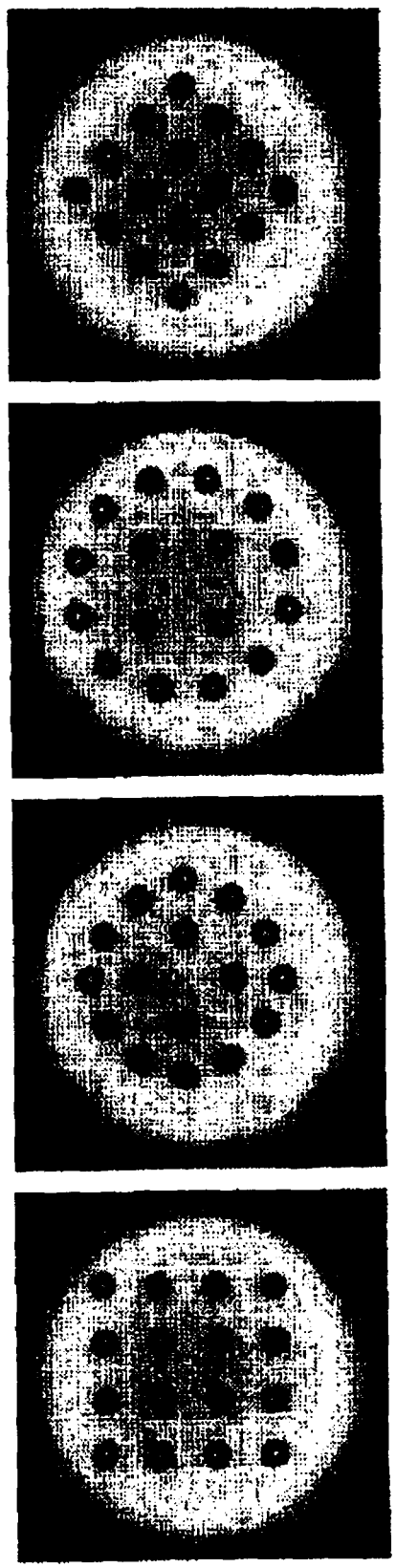
FIG. 8 shows experimental results illustrating 2-D optical manipulation of 16 polystyrene particles each 3 µm in diameter.

The method may be used for optical manipulation. As will be appreciated by one skilled in the art, because the output modes form a series of optimally focused light beams, they will attract high refractive index objects placed in a medium of lower refractive index, from their vicinity via the gradient force. For example, the method may be used for 2-D manipulation, where trapped particles are confined and positioned at the interface of a liquid sample medium and a glass coverslip. In one example, the liquid sample comprises deionized water containing polymer microparticles, each 3 μm in diameter. To provide illumination of particles, white light is coupled into the MMF 12 using a dichroic mirror (not shown) placed between lens L4 and microscope objective MO1 (see FIG. 1). The characterization procedure is repeated with the image plane of the observational objective MO2 moved 15 μm away from the output facet 34 of the MMF 12 to allow enough space for access of particles and manipulation. The output facet 34 is immobilized and submerged into the liquid sample (not shown). The laser light is blocked by a dichroic filter placed before CCD sensor 22, allowing transmission of the white-light signal. In the example shown in FIG. 8, particles are confined in the static intensity pattern formed by complex superposition of output modes and sequentially moved by applying pre-calculated SLM modulation masks corresponding to different arrangements of the output modes.

One skilled in the art will appreciate that modifications of the apparatus and method described above may be possible without departing from the scope of the present invention. For example, rather than comprising a laser light source 14, the apparatus 10 may comprise an alternative coherent source such as a light emitting diode or the like. Alternatively, the apparatus may not comprise a light source at all. Instead, light may be provided to the apparatus from a remote light source.

In some embodiments, the SMF 24 may be replaced by a polarization maintaining fiber, a photonic crystal fiber or the like.

If the SLM were uniformly illuminated and configured to perform amplitude modulation in addition to phase modulation (this may be possible using the SLM 16 in certain configurations), the power losses would be many times higher than those occurring when using phase only modulation at the SLM, because the amplitude modulations (see FIG. 3) have a speckled nature and it would be necessary to sacrifice a large amount of power producing input modes with low amplitude to be able to produce high intensity modes, thus reducing the overall power efficiency to only a few percent when using amplitude modulation in addition to phase modulation at the SLM. However, it should be understood that if further reduction of the random background signal is essential, the simultaneous use of amplitude modulation and phase modulation at the SLM would bring better results.

The GS algorithm is frequently used in Fourier systems to generate arbitrary distributions of intensities with phase only holographic modulation and while employing fast Fourier transform methods this can be very fast and efficient. If the transformation is neither Fourier nor unitary, the GS algorithm can still be used in a form known as Yang-Gu algorithm (G. Z. Yang, B. Z. Dong, B. Y. Gu, J. Y. Zhuang, and O. K. Ersoy, "Gerchberg-saxton and yang-gu algorithms for phase retrieval in a nonunitary transform system: a comparison," Appl. Opt. 33, 209-218 (1994)). This mathematical procedure is introduced below using notation consistent with that used throughout the foregoing description. The procedure starts with the complex superposition of output modes as shown by Equation 5 for the initial iteration. In every following iteration (indexed by t), the amplitude of the SLM modulation is changed to be uniform:

$$\overline{{}^tM}_{k,l}^N = \exp[i \cdot \arg({}^{t-1}M_{k,l}^N)] \qquad (7)$$

the complex constitution coefficients of required output modes ${}^t a_q$ are calculated as a scalar product:

$${}^t c_q = \sum_{k,l} {}^t\overline{M}_{k,l}^N \cdot M_{k,l}^{u_q,v_q,w_q *} \qquad (8)$$

the amplitudes are re-balanced:

$${}^t\overline{c}_q = \sqrt{a_q} \cdot \exp[i \cdot \arg({}^t c_q)] \qquad (9)$$

and a new SLM modulation is generated:

$${}^tM_{k,l}^N = \sum_{q=1}^N {}^t\overline{c}_q \cdot M_{k,l}^{u_q,v_q,w_q} \qquad (10)$$

One skilled in the art will appreciate that other algorithms such as weighted GS algorithms (R. Di Leonardo, F. Ianni, and G. Ruocco, "Computer generation of optimal holograms for optical trap arrays," Opt. Express 15, 1913-1922 (2007)) may bring higher efficiency and uniformity for the output fields.

The numerical aperture of the output modes at the output of the MMF 12 for the apparatus 10 of FIG. 1 is too low to allow stable 3-D confinement of micron-size objects by means of optical tweezers because the axial gradient force cannot counterbalance radiation pressure. It has however, been demonstrated, that micro-structured optical fibers are capable of 3-D optical trapping (C. Liberale, P. Minzioni, F. Bragheri, F. De Angelis, E. Di Fabrizio, and I. Cristiani, "Miniaturized all-fibre probe for three-dimensional optical trapping and manipulation," Nat Photon 1, 723-727 (2007)). The availability of high NA multimode photonics crystal fibers (NA>0:9) may allow novel fiber-based geometries for 3-D holographic multiple optical tweezers employing the algorithms disclosed above (W. Wadsworth, R. Percival, G. Bouwmans, J. Knight, T. Birks, T. Hedley, and P. Russell, "Very high numerical aperture fibres," Photonics Technology Letters, IEEE 16, 843-845 (2004)).

In low NA systems, 3-D confinement can be achieved by introducing a pair of counter-propagating output modes for every optical trap (A. Ashkin, "Acceleration and trapping of particles by radiation pressure," Phys. Rev. Lett. 24, 156-159 (1970), P. J. Rodrigo, V. R. Daria, and J. Glückstad, "Real-time three-dimensional optical micromanipulation of multiple particles and living cells," Opt. Lett. 29, 2270-2272 (2004), and T. Čižmár, O. Brzobohatý, K. Dholakia, and P. Zemánek, "The holographic optical micro-manipulation system based on counter-propagating beams," Laser Physics Letters 8, 50-56 (2011)). Using characterization of multimode fibers for the control of transmission of light in a counter-propagating geometry would represent a major advance for this very popular fiber trap geometry (A. Constable and J. Kim, "Demonstration of a fiber-optical light-force trap," Opt. Lett. 18, 1867-1869 (1993) and J. Guck, R. Ananthakrishnan, H. Mahmood, T. Moon, C. Cunningham, and J. Kas, "The optical stretcher: A novel laser tool to micromanipulate cells," Biophys. J. 81, 767-784 (2001)). 3-D trapping may also be achieved in single-fiber geometry introducing pairs of beams in two distinct axial planes and reflecting them against each other by a mirror (M. Pitzek, R. Steiger, G. Thalhammer, S. Bernet, and M. Ritsch-Marte, "Optical mirror trap with a large field of view," Opt. Express 17, 19414-19423 (2009)).

APPENDIX A

FIGS. 9(a) and (b) demonstrate the overall statistics of peak intensities corresponding to individual output modes when using an internal reference and when using an external reference in the form of SMF 24 respectively. All the 120×120 output modes were generated one-by-one and their peak intensities were recorded by the CCD sensor 22. The data is presented in a form of a bitmap where every point represents the peak intensity of a particular output mode (u;v) as well as histograms of the measured values below. The averaged value of the ratio between the particular mode intensity and the level of surrounding intensity noise $\langle I_{u,v}/I_{bgr}\rangle$ was calculated according to a method disclosed in I. M. Vellekoop and A. P. Mosk, "Focusing coherent light through opaque strongly scattering media," Opt. Lett. 32, 2309-2311 (2007). The resulting data is presented in FIGS. 9(a) and 9(b). Data is only shown for a single output polarization (w=S), but the results for the second output polarization are very similar. The first two columns in FIGS. 9(a) and 9(b) show the results when single input polarizations only were used (Equation 3). The third column in FIGS. 9(a) and 9(b) shows output mode intensities for SLM modulation calculated by phase only superposition of input polarizations (Equation 4). Finally, the last column shows results for complex superposition of input polarizations (Equation 1).

A comparison of FIGS. 9(a) and 9(b) also demonstrates the importance of the external reference. The results of FIG. 9(a) were obtained using an internal reference and 'blind spots' are clearly visible. The results of FIG. 9(b) were obtained using the external SMF reference 24 and show no appreciable blind spots. All the data was taken for the same laser power and the same settings for the CCD sensor 22.

APPENDIX B

Figure 10:
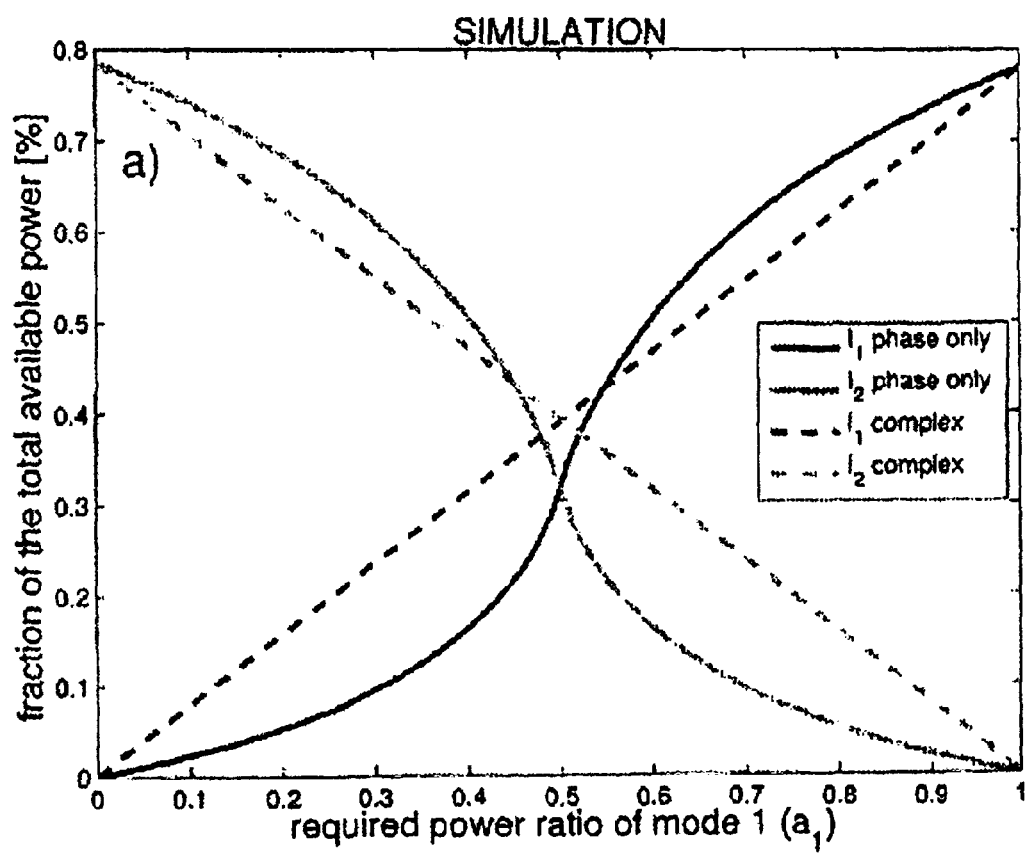
FIG. 10 is a plot showing simulated results for the distribution of power between two output modes for the case of phase only superposition of input polarizations: solid lines—phase only superposition of output modes, dashed lines—complex superposition of output modes.

When multiple output modes are generated simultaneously without the availability of the amplitude terms for individual modes of Equation 4, the resulting power ratio between the modes significantly differs from that intended and the result is accompanied with power losses of up to 20%. This is demonstrated by the numerical simulation results shown in FIG. 10 for the case of complex superposition of input modes (dashed lines) and for the case of phase only superposition of input modes (solid lines) when using phase only modulation at the SLM.

Figure 11:
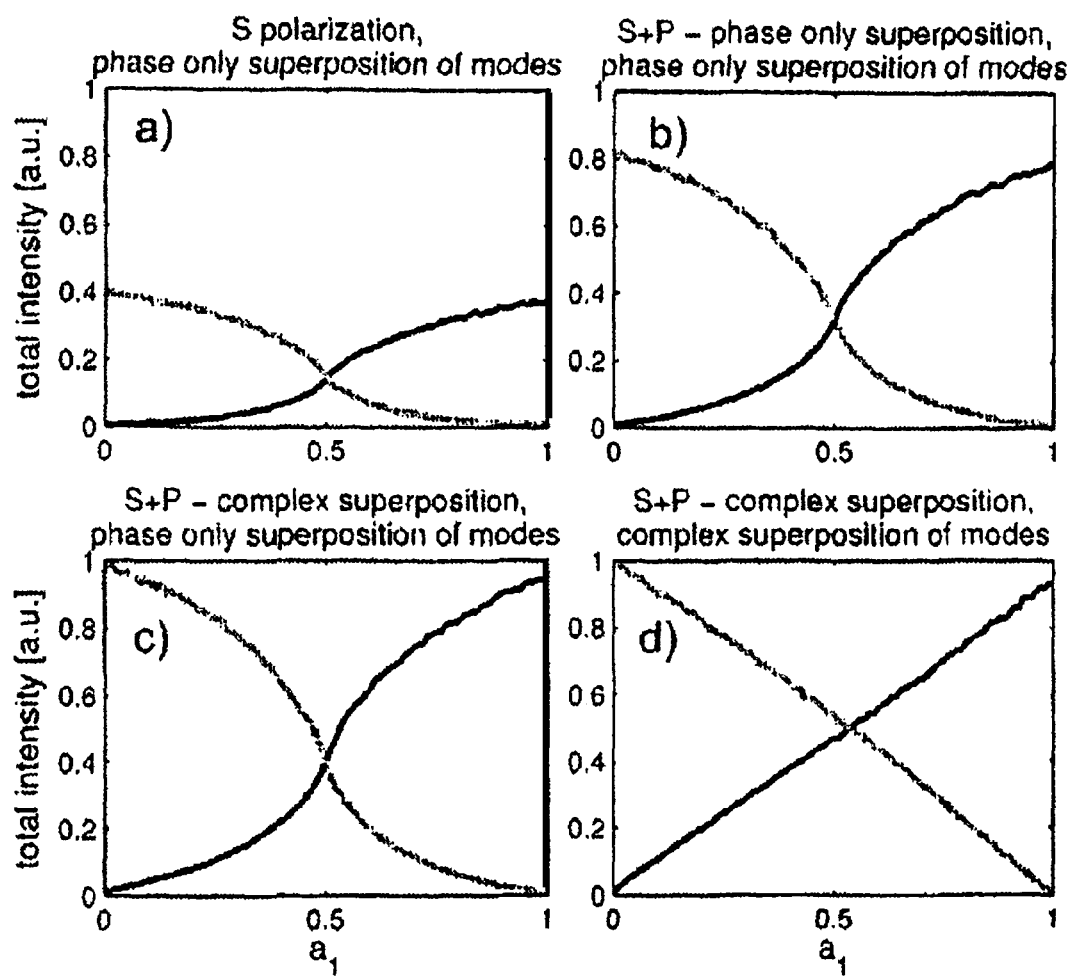
FIG. 11(a) is a plot showing experimental results for the distribution of power between two output modes for the case of an s-polarized input polarization state and phase only superposition of output modes when phase only modulation is used at a spatial light modulator.
FIG. 11(b) is a plot showing experimental results for the distribution of power between two output modes for the case of phase only superposition of input polarizations and phase only superposition of output modes when phase only modulation is used at a spatial light modulator.
FIG. 11(c) is a plot showing experimental results for the distribution of power between two output modes for the case of complex superposition of input polarizations and phase only superposition of output modes when phase only modulation is used at a spatial light modulator.
FIG. 11(d) is a plot showing simulated results for the distribution of power between two output modes for the case of complex superposition of input polarizations and complex superposition of output modes when phase and amplitude modulation are used at a spatial light modulator.

FIGS. 11(a)-11(c) show experimental results for the distribution of optical power between two output modes. FIG. 11(a) corresponds to the case of an s-polarized input polarization state and phase only superposition of output modes when phase only modulation is used at the spatial light modulator. FIG. 11(b) corresponds to the case of phase only superposition of input polarizations and phase only superposition of output modes when phase only modulation is used at the spatial light modulator. The experimental results of FIG. 11(b) correspond to the simulated results of FIG. 10 (solid line). FIG. 11(c) corresponds to the case of complex superposition of input polarizations and phase only superposition of output modes when phase only modulation is used at the spatial light modulator. FIG. 11(d) is a plot showing simulated results for the distribution of power between two output modes for the case of complex superposition of input polarizations and complex superposition of output modes when phase and amplitude modulation are used at the spatial light modulator.

The invention claimed is:

1. A method for use in controlling light transmission through a medium comprising the steps of:
   (i) transmitting light from a single spatial portion of an input optical field through the medium to create an output optical field;
   (ii) superposing the output optical field with a reference optical field to create an optical interference field;
   (iii) detecting an intensity of a spatial portion of a polarization component of the optical interference field;
   (iv) using the detected intensity to determine a value of an optical field amplitude and a value of an optical field phase; and
   (v) repeating steps (i) to (iv) for each of a plurality of spatial portions of the input optical field and for each of first and second orthogonal input polarization states of the transmitted light entering the medium.

2. The method according to claim 1, further comprising:
   controlling a polarization state of the transmitted light entering the medium between the first and second orthogonal input polarization states.

3. The method according to claim 2, further comprising:
   controlling the polarization state of the transmitted light entering the medium by controlling a polarization state of the transmitted light at a location offset from an input end of the medium in a direction opposite to a direction of propagation.

4. The method according to claim 2, further comprising:
   controlling the polarization state of the transmitted light entering the medium by selectively directing the transmitted light along a first or a second optical path each of which extends from a given spatial portion of the input optical field to the medium, wherein the first optical path extends through a polarization controller which operates to provide the light entering the medium with the first orthogonal input polarization state and the second optical path by-passes the polarization controller and enters the medium with the second orthogonal input polarization state.

5. The method according to claim 2, further comprising:
   controlling the polarization state of the light transmitted from a given spatial portion of the input optical field between the first and second orthogonal input polarization states before transmitting light from a next spatial portion of the input optical field.

6. The method according to claim 1, further comprising:
   transmitting light from each of the plurality of spatial portions of the input optical field so that the transmitted light enters the medium with the first orthogonal input polarization state; and
   transmitting light from each of the plurality of spatial portions of the input optical field so that the transmitted light enters the medium with the second orthogonal input polarization state.

7. The method according to claim 1, further comprising:
   detecting an intensity of the spatial portion of the polarization component of the optical interference field for each of the plurality of spatial portions of the input optical field and for each of the first and second orthogonal input polarization states of the transmitted light entering the medium; and using the detected intensity to determine an optical field amplitude value and an optical field phase value.

8. The method according to claim 1, wherein the plurality of spatial portions of the input optical field constitute a plurality of input modes which together provide a basis set for the representation of the input optical field.

9. The method according to claim 1, further comprising selecting the polarization component of the optical interference field.

10. The method according to claim 1, wherein the input optical field is offset from an input end of the medium in a direction opposite to a direction of propagation.

11. The method according to claim 1, wherein the input optical field is located at an input end of the medium.

12. The method according to claim 1, wherein the output optical field is offset from an output end of the medium in the direction of propagation.

13. The method according to claim 1, wherein the output optical field is located at an output end of the medium.

14. The method according to claim 1, further comprising:
detecting a variation in the intensity of the spatial portion of the polarization component of the optical interference field for a given spatial portion of the input optical field and for a given orthogonal input polarization state whilst varying a phase applied to the given spatial portion of the input optical field; and
determining the optical field amplitude value and the optical field phase value for the given spatial portion of the input optical field and for the given orthogonal input polarization state from the detected variation in the intensity of the spatial portion of the polarization component of the optical interference field as a function of the phase applied to the spatial portion of the input optical field.

15. The method according to claim 14, further comprising:
determining the optical field amplitude value for the given spatial portion of the input optical field and the given orthogonal input polarization state from the amplitude of the detected variation in the intensity of the spatial portion of the polarization component of the optical interference field as a function of the phase applied to the given spatial portion of the input optical field.

16. The method according to claim 15, wherein the determined optical field amplitude value is the amplitude of the detected variation in the intensity of the spatial portion of the polarization component of the optical interference field as a function of the phase applied to the given spatial portion of the input optical field.

17. The method according to claim 14, further comprising:
determining the optical field phase value for the given spatial portion of the input optical field and the given orthogonal input polarization state from the value of the phase applied to the given spatial portion of the input optical field which corresponds to a distinguishable feature in the detected variation in the intensity of the spatial portion of the polarization component of the optical interference field as a function of the phase applied to the given spatial portion of the input optical field.

18. The method according to claim 17, wherein the determined optical field phase value is a value of the phase applied to the given spatial portion of the input optical field which corresponds to the distinguishable feature in the detected variation in the intensity of the spatial portion of the polarization component of the optical interference field as a function of the phase applied to the given spatial portion of the input optical field.

19. The method according to claim 1, further comprising:
transmitting a spatial portion of the input optical field along a reference path to form the reference optical field.

20. The method according to claim 19, wherein the reference path is external to the medium.

21. The method according to claim 19, wherein the reference path is non-randomizing with respect to amplitude, phase and/or polarization.

22. The method according to claim 19, wherein the reference path extends through an optical waveguide.

23. The method according to claim 19, wherein the reference path extends through a single-mode optical waveguide.

24. The method according to claim 19, wherein the reference path extends through a single mode optical fiber.

25. The method according to claim 19, further comprising phase stabilizing the reference path.

26. The method according to claim 19, further comprising:
measuring any phase changes occurring in the reference path; and
using any measured reference path phase changes to correct the determined optical field amplitude values and/or the determined optical field phase values.

27. The method according to claim 1, further comprising:
determining a first complex transformation from the determined optical field amplitude values and the determined optical field phase values for each of the spatial portions of the input optical field and the first orthogonal input polarization state;
determining a second complex transformation from the determined optical field amplitude values and the determined optical field phase values for each of the spatial portions of the input optical field and the second orthogonal input polarization state; and
determining a complex modulation function for the polarization component of the output optical field by performing a complex superposition of the determined first and second complex transformations for each of the spatial portions of the input optical field.

28. The method according to claim 27, further comprising:
applying a phase change to each of the spatial portions of the input optical field and selecting an orthogonal input polarization state of each of the spatial portions of the input optical field according to the complex modulation function so as to create a spatial portion of the output optical field which matches a spatial portion of a target output optical field having a target amplitude, a target phase and, a target polarization state.

29. The method according to claim 27, further comprising:
applying an attenuation to each of the spatial portions of the input optical field according to the complex modulation function so as to create a spatial portion of the output optical field which matches a spatial portion of a target output optical field having a target amplitude, a target phase, and a target polarization state.

30. The method according to claim 1, further comprising:
detecting an intensity of each of a plurality of spatial portions of the polarization component of the optical interference field for each of the plurality of spatial portions of the input optical field and for each of the first and second orthogonal input polarization states; and
using the detected intensities to determine a value of an optical field amplitude and a value of an optical field phase for each of the plurality of spatial portions of the polarization component of the optical interference field, for each of the plurality of spatial portions of the input optical field and for each of the first and second orthogonal input polarization states.

31. The method according to claim 30, further comprising:
using the determined optical field amplitude values and the determined optical field phase values for each of the plurality of spatial portions of the polarization component of the optical interference field, for each of the plurality of spatial portions of the input optical field and for each of the first and second orthogonal input polarization states to create an output optical field which matches a target output optical field having a target spatial distribution of amplitudes, a target spatial distribution of phases, and a target spatial distribution of polarization states.

32. The method according to claim 31, further comprising:
applying an optimization algorithm to enhance a match between an intensity distribution of the created output optical field and an intensity distribution of the target output optical field.

33. The method according to claim 32, further comprising:
applying a Gerchberg-Saxton (GS) algorithm to enhance the match between the intensity distribution of the created output optical field and the intensity distribution of the target output optical field.

34. The method according to claim 1, further comprising:
detecting a variation in the intensity of a spatial portion of the polarization component of the optical interference field and a spatial portion of a further polarization component of the optical interference field for a given spatial portion of the input optical field and for a given orthogonal input polarization state whilst varying a phase applied to the given spatial portion of the input optical field; and
determining an optical field amplitude value and an optical field phase value for the given spatial portion of the input optical field and the given orthongonal input polarization state from the detected variation in the intensity of the spatial portion of the polarization component of the optical interference field and the spatial portion of the further polarization component of the optical interference field as a function of the phase applied to the given spatial portion of the input optical field, wherein the polarization component of the optical interference field and the further polarization component of the optical interference field have orthogonal polarization states.

35. The method according to claim 34, further comprising:
using the determined optical field amplitude values and the determined optical field phase values for each spatial portion of the input optical field, for each of a first and second orthogonal input polarization states, and for each of the polarization component, and for the further polarization component of the optical interference field to create a spatial portion of the output optical field which matches a spatial portion of a target output optical field having a target amplitude, a target phase, and a target polarization state.

36. The method according to claim 34, further comprising:
detecting an intensity of each of a plurality of spatial portions of the polarization component of the optical interference field and of each of a plurality of spatial portions of the further polarization component of the optical interference field, for each of the plurality of spatial portions of the input optical field and for each of a first and second orthogonal input polarization states; and
using the detected intensities to determine a value of an optical field amplitude and a value of an optical field phase for each of the plurality of spatial portions of the polarization component of the optical interference field, for each of the plurality of spatial portions of the further polarization component of the optical interference field, for each of the plurality of spatial portions of the input optical field, and for each of the first and second orthogonal input polarization states.

37. The method according to claim 36, further comprising:
using the determined optical field amplitude values and the determined optical field phase values for each of the plurality of spatial portions of the input optical field, for each of a first and second orthogonal input polarization states, for each of the plurality of spatial portions of the polarization component, and for the further polarization component of the optical interference field to create an output optical field which matches a target output optical field having a target spatial distribution of amplitudes, a target spatial distribution of phases, and a target spatial distribution of polarization states.

38. The method according to claim 37, comprising:
applying an optimization algorithm to enhance a match between an intensity distribution of the created output optical field and an intensity distribution of the target output optical field.

39. The method according to claim 38, further comprising:
applying a Gerchberg-Saxton (GS) algorithm to enhance the match between the intensity distribution of the created output optical field and the intensity distribution of the target output optical field.

40. The method according to claim 1, wherein the medium randomizes amplitude, phase, or polarization.

41. A method according to claim 1, wherein the medium comprises a multi-mode fiber.

42. A method of shaping an optical field comprising:
transmitting light from a single spatial portion of an input optical field through a medium to create an output optical field;
superposing the output optical field with a reference optical field to create an optical interference field;
detecting an intensity of each of a plurality of spatial portion of a polarization component of the optical interference field for each of the plurality of spatial portions of the input optical field and for each of a first and second orthogonal input polarization states;
using the detected intensity to determine a value of an optical field amplitude and a value of an optical field phase for each of the plurality of spatial portions of the polarization component of the optical interference field, for each of the plurality of spatial portions of the input optical field, and for each of the first and second orthogonal input polarization states; and
using the determined optical field amplitude values and the determined optical field phase values for each of the plurality of spatial portions of the polarization component of the optical interference field, for each of the plurality of spatial portions of the input optical field, and for each of the first and second orthogonal input polarization states to create an output optical field which matches a target output optical field having a target spatial distribution of amplitudes, a target spatial distribution of phases, and a target spatial distribution of polarization states.

43. A method of transforming an input optical field on an input side of a medium to an output optical field on an output side of the medium comprising:
transmitting light from a single spatial portion of an input optical field through a medium to create an output optical field;
superposing the output optical field with a reference optical field to create an optical interference field;

detecting an intensity of each of a plurality of spatial portion of a polarization component of the optical interference field, for each of the plurality of spatial portions of the input optical field, and for each of a first and second orthogonal input polarization states;

using the detected intensity to determine a value of an optical field amplitude and a value of an optical field phase for each of the plurality of spatial portions of the polarization component of the optical interference field, for each of the plurality of spatial portions of the input optical field and for each of the first and second orthogonal input polarization states; and using the determined optical field amplitude values and the determined optical field phase values for each of the plurality of spatial portions of the polarization component of the optical interference field, for each of the plurality of spatial portions of the input optical field, and for each of the first and second orthogonal input polarization states to create an output optical field which matches a target output optical field having a target spatial distribution of amplitudes, a target spatial distribution of phases, and a target spatial distribution of polarization states.

44. A method of shaping an optical field comprising:

transmitting light from a single spatial portion of an input optical field through a medium to create an output optical field;

superposing the output optical field with a reference optical field to create an optical interference field;

detecting an intensity for each of a plurality of spatial portions of a polarization component of the optical interference field, for each of a plurality of spatial portions of a further polarization component of the optical interference field, and for each of a plurality of spatial portions of the input optical field and for each of a first and second orthogonal input polarization states;

using the detected intensities to determine a value of an optical field amplitude and a value of an optical field phase for each of the plurality of spatial portions of the polarization component of the optical interference field, for each of the plurality of spatial portions of the further polarization component of the optical interference field, for each of the plurality of spatial portions of the input optical field, and for each of the first and second orthogonal input polarization states; and using the determined optical field amplitude values and the determined optical field phase values for each of the plurality of spatial portions of the input optical field, for each of the first and second orthogonal input polarization states, for each of the plurality of spatial portions of the polarization component, and for the further polarization component of the optical interference field to create an output optical field which matches a target output optical field having a target spatial distribution of amplitudes, a target spatial distribution of phases and a target spatial distribution of polarization states.

45. A method of transforming an input optical field on an input side of a medium to an output optical field on an output side of the medium comprising;

transmitting light from a single spatial portion of an input optical field through a medium to create an output optical field;

superposing the output optical field with a reference optical field to create an optical interference field;

detecting an intensity for each of a plurality of spatial portions of a polarization component of the optical interference field, for each of a plurality of spatial portions of a further polarization component of the optical interference field, for each of a plurality of spatial portions of the input optical field, and for each of a first and second orthogonal input polarization states;

using the detected intensities to determine a value of an optical field amplitude and a value of an optical field phase for each of the plurality of spatial portions of the polarization component of the optical interference field, for each of the plurality of spatial portions of the further polarization component of the optical interference field, for each of the plurality of spatial portions of the input optical field, and for each of the first and second orthogonal input polarization states; and using the determined optical field amplitude values and the determined optical field phase values for each of the plurality of spatial portions of the input optical field, for each of the first and second orthogonal input polarization states, for each of the plurality of spatial portions of the polarization component, and for the further polarization component of the optical interference field to create an output optical field which matches a target output optical field having a target spatial distribution of amplitudes, a target spatial distribution of phases and a target spatial distribution of polarization states.

46. A method of imaging comprising transmitting light from a single spatial portion of an input optical field through a medium to create an output optical field;

superposing the output optical field with a reference optical field to create an optical interference field;

detecting an intensity for each of a plurality of spatial portions of a polarization component of the optical interference field, for each of a plurality of spatial portions of a further polarization component of the optical interference field, for each of the plurality of spatial portions of the input optical field, and for each of a first and second orthogonal input polarization states;

using the detected intensities to determine a value of an optical field amplitude and a value of an optical field phase for each of the plurality of spatial portions of the polarization component of the optical interference field, for each of the plurality of spatial portions of the further polarization component of the optical interference field, for each of the plurality of spatial portions of the input optical field, and for each of the first and second orthogonal input polarization states;

using the determined optical field amplitude values and the determined optical field phase values for each of the plurality of spatial portions of the input optical field, for each of the first and second orthogonal input polarization states, for each of the plurality of spatial portions of the polarization component, and for the further polarization component of the optical interference field to create an output optical field which matches a target output optical field having a target spatial distribution of amplitudes, a target spatial distribution of phases and a target spatial distribution of polarization states; and producing an image on one side of the medium of an object located on an opposite side of the medium.

47. A method of optically trapping a particle suspended in a liquid medium comprising:

transmitting light from a single spatial portion of an input optical field through the medium to create an output optical field;

superposing the output optical field with a reference optical field to create an optical interference field;

detecting an intensity of a spatial portion of a polarization component of the optical interference field;

using the detected intensity to determine a value of an optical field amplitude and a value of an optical field phase;

determining a target output optical field required to optically trap the particle in the medium; and using the determined optical field amplitude values and the determined optical field phase values for each of a plurality of spatial portions of the input optical field, for each of a first and second input orthogonal polarization states, and for each spatial portion of the polarization component of the optical interference field to create an output optical field which matches the target output optical field.

48. A method of optically manipulating a particle suspended in a liquid medium comprising:

transmitting light from a single spatial portion of an input optical field through the medium to create an output optical field;

superposing the output optical field with a reference optical field to create an optical interference field;

detecting an intensity of a spatial portion of a polarization component of the optical interference field;

using the detected intensity to determine a value of an optical field amplitude and a value of an optical field phase;

determining a moving target output optical field required to optically manipulate the particle in the medium; and using the determined optical field amplitude values and the determined optical field phase values for each of a plurality of spatial portions of the input optical field, for each of a first and second input orthogonal polarization states, and for each spatial portion of the polarization component of the optical interference field to create a moving output optical field which matches the moving target output optical field.

49. An apparatus for use in controlling light transmission through a medium comprising:

a spatial light modulator configured to sequentially transmit light from each of a plurality of spatial portions of an input optical field incident on the spatial light modulator through the medium to create an output optical field;

an input polarization control arrangement configured to sequentially define first and second input polarization states of light entering the medium from each of the plurality of spatial portions of the input optical field;

a beam combining arrangement configured to superpose the output optical field and a reference optical field so as to create an optical interference field;

an output polarization control arrangement configured to select a polarization component of the optical interference field;

an optical detector configured to receive a spatial portion of the polarization component of the optical interference field; and a controller configured:

to control the spatial light modulator so that the spatial light modulator sequentially transmits light from each of the plurality of spatial portions of the input optical field through the medium;

to control the input polarization control arrangement to sequentially define the first and second input polarization states;

to receive detected intensities from the detector; and to use the detected intensities to determine an optical field amplitude value and an optical field phase value.

* * * * *